(12) United States Patent
du Preez et al.

(10) Patent No.: US 8,832,175 B2
(45) Date of Patent: Sep. 9, 2014

(54) METHODS AND APPARATUS FOR DYNAMIC ENDPOINT GENERATORS AND DYNAMIC REMOTE OBJECT DISCOVERY AND BROKERAGE

(75) Inventors: Jacobus du Preez, Snoqualmie, WA (US); Richard Grimes Cowan, Nashville, TN (US); Anthony Thomas Petro, Silverthorn, CO (US)

(73) Assignee: SourceCode Technology Holdings, Inc., Redmond, WA (US)

( * ) Notice: Subject to any disclaimer, the term of this patent is extended or adjusted under 35 U.S.C. 154(b) by 390 days.

(21) Appl. No.: 13/237,616

(22) Filed: Sep. 20, 2011

(65) Prior Publication Data

US 2012/0143938 A1 Jun. 7, 2012

Related U.S. Application Data

(60) Provisional application No. 61/384,879, filed on Sep. 21, 2010.

(51) Int. Cl.
*G06F 15/16* (2006.01)
*G06F 9/445* (2006.01)
*G06F 9/46* (2006.01)

(52) U.S. Cl.
CPC . *G06F 8/65* (2013.01); *G06F 9/465* (2013.01)
USPC .......................................... 709/201; 709/217

(58) Field of Classification Search
CPC ................... H04L 29/08072; H04L 29/08081; H04L 29/08135
USPC ......................................................... 709/201
See application file for complete search history.

(56) References Cited

U.S. PATENT DOCUMENTS 8,572,157 B2 * 10/2013 Bouw et al. ................... 709/202

FOREIGN PATENT DOCUMENTS

EP 1 688 836 8/2006
EP 1688836 A1 * 8/2006

OTHER PUBLICATIONS

Tabor, R: "Microsoft.NET XML Web Services", Dec. 2001, SAMS, XP007920364 ISBN: 0-672-32088-6.*
International Preliminary Report on Patentability issued Mar. 26, 2013 in corresponding PCT Application No. PCT/US2011/052574.
Microsoft, Introducing Windows Communication Foundation, David Chappell, Chappell & Associates, Jan. 2010.

* cited by examiner

*Primary Examiner* — Tauqir Hussain
(74) *Attorney, Agent, or Firm* — K&L Gates LLP

(57) ABSTRACT

The system and method disclosed herein is a dynamic endpoint generator that enables a client device or application to consume business objects. The business objects are dynamic business objects whose definitions can be changed by either adding or removing data or actions without the need to involve technical or development resources to reconfigure or recompile the actual objects. The endpoint generator provides updated endpoint information automatically without the need for manual generation of endpoint or contract data. If a business object is modified or newly added, the endpoint generator is automatically notified and publishes information about the modified or newly added object. The client device that is accessing the business object is notified about the modified or newly added object. Or, an endpoint is generated when a client device requests a business object.

24 Claims, 37 Drawing Sheets

```
formProduct.cs [Design]    formProduct.cs  X
WindowsFormsClientDevice.formProduct              buttonCreate_Click(object sender, EventArgs e)
    private void buttonCreate_Click(object sender, EventArgs e)
    {
        // Open connection to Products service client
        DemoService.ProductsSvcClient productsSvcClient = new DemoService.ProductsSvcClient();
        productsSvcClient.Open();                                                              — 2604

// Populate an instance of Product to pass to Create method
        DemoService.Products products = new DemoService.Products();
        products.Name = textBoxName.Text;
        products.Category = comboBoxCategory.Text;
        productsSvcClient.ProductsSvc_Create(products);          ———————— 3202

// Close connection to Products service client
        productsSvcClient.Close();

// Refresh the grid with new data
        RefreshGridData();
    }                                                               2604 private void RefreshGridData()
    {
        // Open connection to Products service client
        DemoService.ProductsSvcClient productsSvcClient = new DemoService.ProductsSvcClient();
        productsSvcClient.Open();

// Call GetList on Products SmartObject and bind results to client side grid
        dataGridViewProducts.DataSource = productsSvcClient.ProductsSvc_GetList(null);

// Close connection to Products service client
        productsSvcClient.Close();                                    — 2414
    }
100%
```

FIG. 32

METHODS AND APPARATUS FOR DYNAMIC ENDPOINT GENERATORS AND DYNAMIC REMOTE OBJECT DISCOVERY AND BROKERAGE

RELATED APPLICATIONS

This application claims priority to U.S. Patent Application Ser. No. 61/384,879, entitled "Methods and Apparatus for Dynamic Endpoint Generators and Dynamic Remote Object Discovery and Brokerage."

TECHNICAL FIELD

The present application relates in general to dynamic endpoint generators, and more specifically to methods and apparatus for dynamic endpoint generators that automatically publish an endpoint for business objects so that remote client devices can easily discover and access business objects.

BACKGROUND

As the number of information sources in organizations are growing, it is becoming increasingly difficult for consumers of the information to access it in a logical and structured way that relates to the traditional business objects they find familiar within their organizations (e.g., customers, assets, vendors, staff, etc). Data from existing systems is typically made available in a very technical way that requires significant technical and development skills to surface it to non-technical users in the organization. Non-technical users need to be able to add information within a logical business object definition without involving technical or development skills. Both technical and non-technical users of data need to be able to access their information from multiple data/information sources in a structured business object like way, while still maintaining the flexibility to add additional information definitions to the existing business objects or to create new business objects from existing or new data sources without the need for complex solution development.

Existing Enterprise Application Integration (EAI) systems combined with development tools can be used to custom develop solutions which make data and information more accessible, but these solutions are typically hard-coded and require significant technical and development skill to maintain and change over time. In addition, information workers are limited by the static business forms and information presented to them by the solution applications or custom developed applications they use on a day to day basis. Still further, existing process automation tools do not provide the necessary level of modeling tools and concepts to allow both technical and non-technical users to author a completed business process solution in a single modeling/automation tooling environment.

These problems can be solved by using Enterprise Application Integration (EAI) sources (e.g., EAI software, Web Services, Application API) to provide a higher level framework (e.g., runtime broker and adapter services) with relating solution components (e.g., user interfaces and tooling) which empowers technical and non-technical users to author logical business objects which includes data definitions (e.g., customer name, surname, etc) and actions or methods (e.g., save, load, delete) from existing or new data sources. Users can combine data from multiple sources into one single business object definition, including data and method/actions definitions. The logical business object is a smart object that exposes a single logical data structure and view of the business object as well as a single set of logical methods that are associated with the business object. The business object is dynamic, and its definition can be changed by either adding or removing data or actions without the need to involve technical or development resources to reconfigure or recompile the actual business objects.

However, once a dynamic business object has been created, it cannot be easily accessed and consumed by remote client devices. Today's technologies require that before the business object can be consumed through existing web service technologies, an endpoint must be defined. An endpoint is used to specify the interaction requirements between the client device and the business object. For example, the client device sends a message to the business object's endpoint when it wants to use the business object, and the message is formatted according to information specified by the endpoint. A business object may have multiple endpoints that allow different ways for clients to consume that business object.

Typically, an endpoint is defined by an address, a binding, and a contract. An address is the location where the endpoint resides. A binding specifies how a business object can be consumed, such as, for example, protocol or encoding information. A contract for each object lists the operations exposed by the business object. All of this information must be specified before a business object can be used by a remote client device.

This approach presents several problems. The contract must be manually generated for each object. Because the endpoint includes the contract, the endpoint is also manually generated for each object. Manual generation of a contract (and thus the endpoint) can be expensive and time-consuming and is susceptible to user error. Further, the endpoint can become stale if it is not updated as soon as the business object is updated and the user may rely on endpoint information that does not accurately represent the business object.

Accordingly, there is a need in the art for a more efficient, cost-effective, and accurate way to allow client devices to access and consume remote business objects.

SUMMARY

The method and apparatus disclosed herein allow technical and non-technical users to enable clients to discover, access and consume objects without the need to manually generate an endpoint for each object. An endpoint may be any information that a client device needs before the client device can communicate with a business object. The client can request to consume or use a business object, and the endpoint information, such as the contract, is automatically constructed and published. To the client, it appears as though an endpoint already existed in place, even though it was generated when the client requested the business object. Or, the endpoint is automatically constructed and published when the business object is created.

This entire process takes place without the existence of actual typed address, binding, or contract information that represents the remote object. The endpoint information is dynamic and accurately represents the most current information about the business object. In this manner, a client device can easily discover and request an endpoint for a business object.

Additional features and advantages are described herein, and will be apparent from the following Detailed Description and the figures.

BRIEF DESCRIPTION OF THE FIGURES

FIG. 22 is a screenshot of an example of publishing a business object on a server.

FIG. 27 is a screenshot of an example of a WCF endpoint in WSDL.

FIG. 31 is a screenshot of an example of business object metadata provided to a client device.

FIG. 32 is a screenshot of an example of business object data and method provided to a client device.

DETAILED DESCRIPTION

Figure 1:
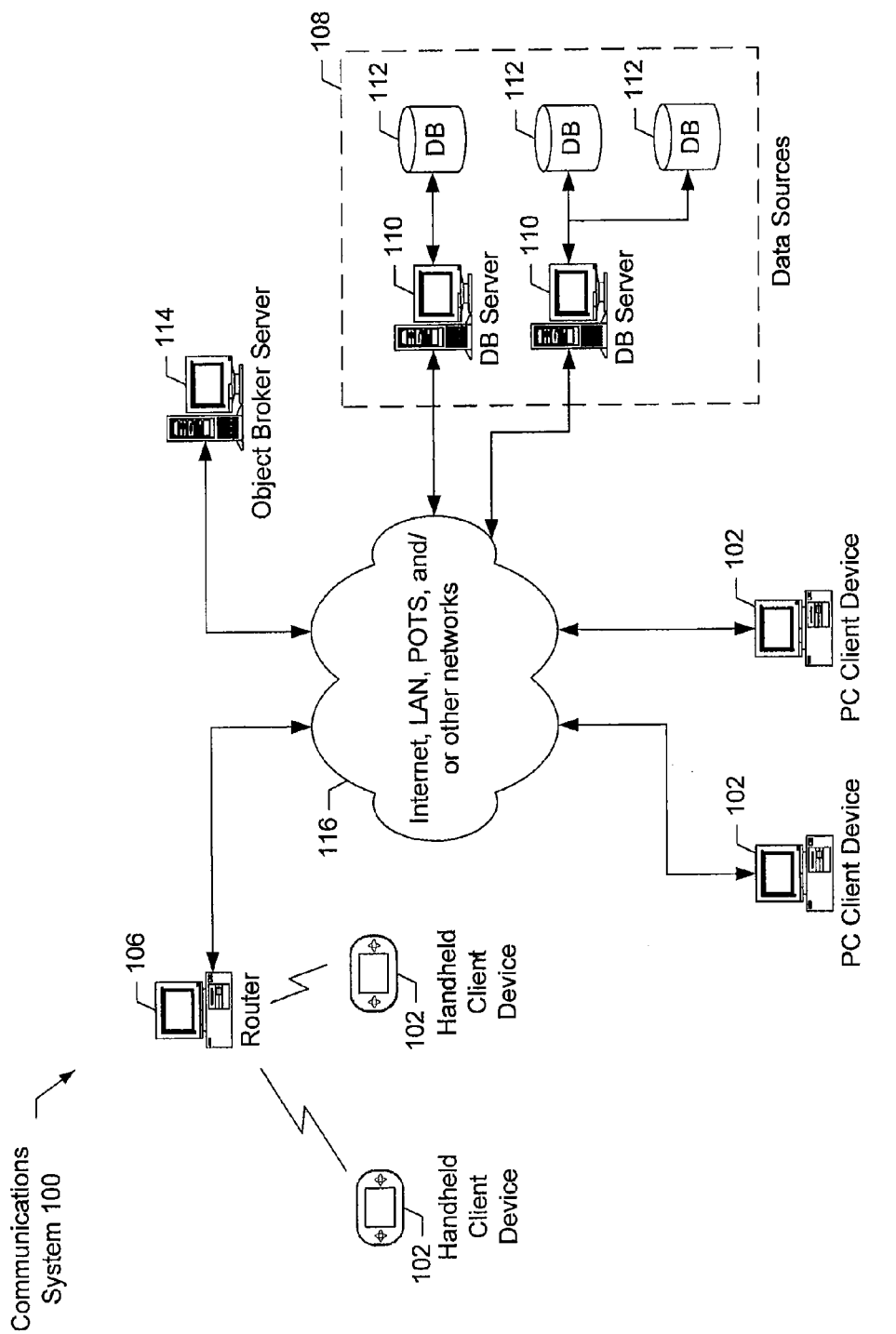
FIG. 1 is a high level block diagram of an example communications system.

The present system is most readily realized in a network communications system. A high level block diagram of an exemplary network communications system 100 is illustrated in FIG. 1. The illustrated system 100 includes one or more client devices 102, one or more routers 106, and a plurality of different data sources 108 including database servers 110 and/or databases 112. Data transferred to/from the client devices 102 from/to the data sources 108 is managed by one or more object broker servers 114. Each of these devices may communicate with each other via a connection to one or more communications channels 116 such as the Internet and/or some other data network, including, but not limited to, any suitable wide area network or local area network. It will be appreciated that any of the devices described herein may be directly connected to each other instead of over a network.

The data sources 108 store a plurality of files, programs, and/or web pages in one or more databases 112 for use by the client devices 102. For example, a data source may store customer information. The data sources 108 may be connected directly to a database server 110 and/or via one or more network connections.

One data source 108 and/or one object broker server 114 may interact with a large number of other devices. Accordingly, each data source 108 and/or one object broker server 114 is typically a high end computer with a large storage capacity, one or more fast microprocessors, and one or more high speed network connections. Conversely, relative to a typical server, each client device 102 typically includes less storage capacity, a single microprocessor, and a single network connection.

Figure 2:
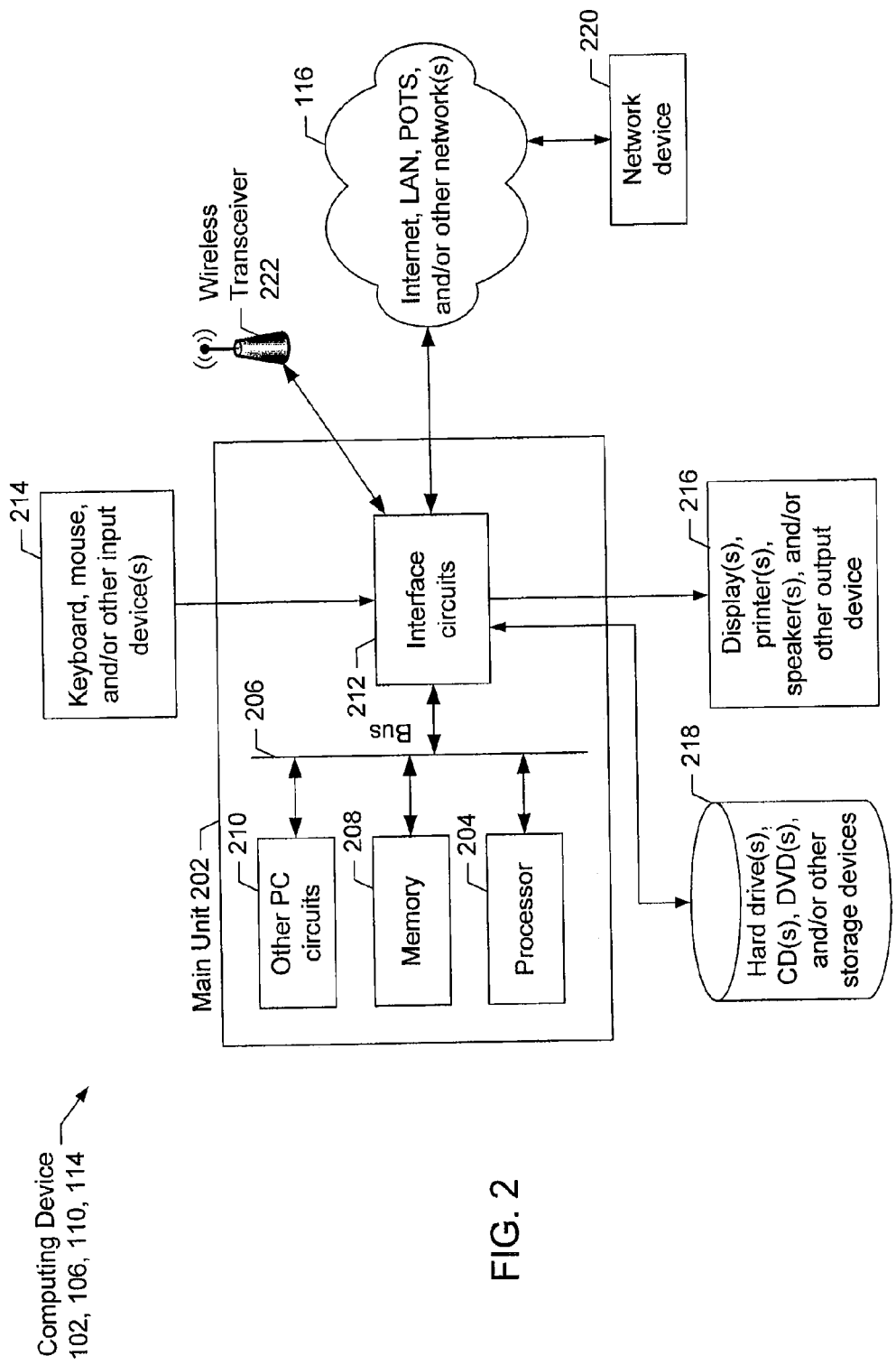
FIG. 2 is a more detailed block diagram showing one example of a computing device.

A more detailed block diagram of the electrical systems of a computing device (e.g., handheld client device 102, personal computer client device 102, router 106, database server 110, and/or object broker server 114) is illustrated in FIG. 2. Although the electrical systems of these computing devices may be similar, the structural differences between these devices are well known. For example, a typical handheld client device 102 is small and lightweight compared to a typical database server 110.

The example computing device 102, 106, 110, 114 includes a main unit 202 which preferably includes one or more processors 204 electrically coupled by an address/data bus 206 to one or more memory devices 208, other computer circuitry 210, and one or more interface circuits 212. The processor 204 may be any suitable processor, such as a microprocessor from the INTEL PENTIUM® family of microprocessors. The memory 208 preferably includes volatile memory and non-volatile memory. Preferably, the memory 208 stores a software program that interacts with the other devices in the system 100 as described below. This program may be executed by the processor 204 in any suitable manner. The memory 208 may also store digital data indicative of documents, files, programs, web pages, etc. retrieved from another computing device and/or loaded via an input device 214.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, and/or a voice recognition system.

One or more displays, printers, speakers, and/or other output devices 216 may also be connected to the main unit 202 via the interface circuit 212. The display 216 may be a cathode ray tube (CRTs), liquid crystal displays (LCDs), or any other type of display. The display 216 generates visual displays of data generated during operation of the computing device 102, 106, 110, 114. For example, the display 216 may be used to display web pages received from the object broker server 114 including data from multiple data sources 108. The visual displays may include prompts for human input, run time statistics, calculated values, data, etc.

One or more storage devices 218 may also be connected to the main unit 202 via the interface circuit 212. For example, a hard drive, CD drive, DVD drive, and/or other storage devices may be connected to the main unit 202. The storage devices 218 may store any type of suitable data.

The computing device 102, 104 may also exchange data with other network devices 220 via a connection to the network 116. The network connection may be any type of network connection, such as an Ethernet connection, digital subscriber line (DSL), telephone line, coaxial cable, etc. Users of the system 100 may be required to register with one or more of the computing devices 102, 106, 110, 114. In such an instance, each user may choose a user identifier (e.g., e-mail address) and a password which may be required for the activation of services. The user identifier and password may be passed across the network 116 using encryption built into the user's web browser. Alternatively, the user identifier and/or password may be assigned by the computing device 102, 106, 110, 114.

Figure 3:
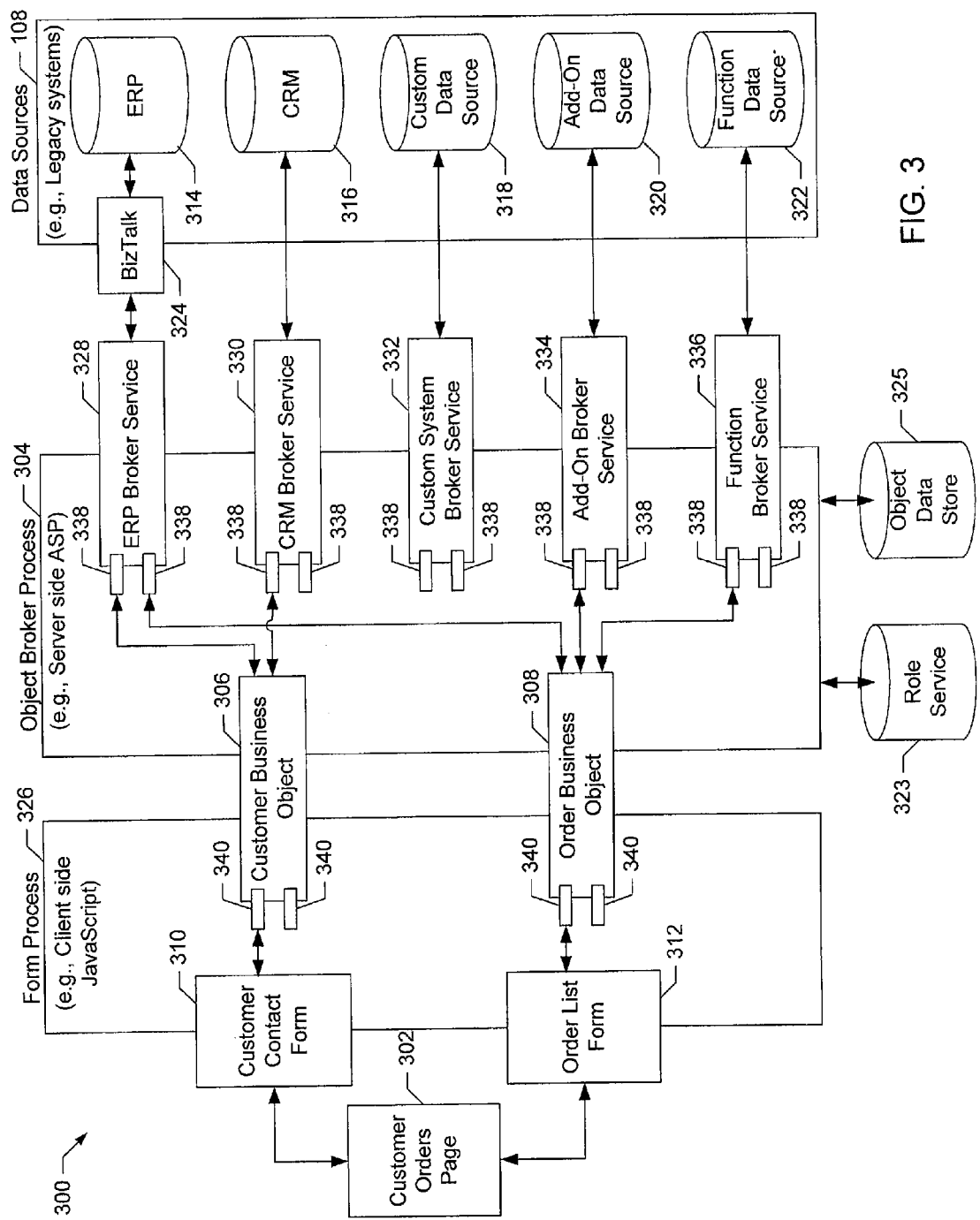
FIG. 3 is a block diagram showing example connections between a plurality of data sources and an electronic form via an object broker.

In one embodiment, a user at a client device 102 views and/or modifies data from a plurality of different data sources 108 via an interactive electronic form. An example block diagram showing connections between a plurality of data sources 108 and an electronic form 302 via an object broker process 304 is illustrated in FIG. 3. In general, the object broker process 304 (described in detail below with reference to FIG. 6) compiles data in a variety of different native formats from the different data sources 108 (e.g., different legacy database systems) into standardized business objects 306, 308 (e.g., in a declarative format such as Extensible Markup Language (XML)). A user may then view the data using one or more electronic forms 302, 310, 312. In addition, the user may manipulate the data and/or add data via the electronic forms 302, 310, 312. In such instance, the object broker process 304 accepts the data via the business objects 306, 308 and stores the data back to the data sources 108 in the correct native format.

In this example, the data sources 108 include an enterprise resource planning (ERP) data source 314, a customer relationship management (CRM) data source 316, a custom data source 318, an add-on data source 320, and a function data source 322. In addition, a role service 323 and an object data store 325 are included in the system. Typically, an ERP data source 314 stores data related to accounts receivable, accounts payable, inventory, etc. Typically, a CRM data source 316 stores data related to leads, quotes, orders, etc. A custom data source 318 is a data source 108 that is not considered a standard commercial product. For example, a business may have a custom data source that stores real-time manufacturing information. Some data sources 108 may use an intermediary server for communications. For example, the ERP data source 314 uses a BizTalk server 324.

The add-on data source 320 stores data associated with form fields added by the user that are not supported by one of the other data sources 108. For example, a business may start up a frequent shopper card program and need to store a card number for each participant. Accordingly, a user may add a frequent buyer number field to an existing form containing legacy data. Because the existing data sources 108 in this example do not include a frequent buyer number field, the frequent buyer number field and associated data are stored by the add-on data source 320.

In order to manipulate data in a particular data source 108, the object broker process 304 preferably calls methods built into the associated data source 108. For example, each data source 108 typically includes methods to store/retrieve data to/from the data source 108 (e.g., the CRM data source may support a "LoadContact" method as described in detail below). In addition, the system 300 allows a user to author their own functions. For example, a user may need to apply a discount to certain customers. However, the existing data sources 108 may not include a method to calculate the discount. Accordingly, the user may author a "CalcDiscount" function as described below. User defined functions may use data from more than one data source 108. The definitions for these user defined functions is then stored in the function data source 322.

User defined functions may be created using a graphical user interface tool. For example, parameters for a user defined function may be defined by selecting a graphical representation of the parameter associated with a business object. Preferably, user defined functions are stored as snippets. Snippets include a structure portion that defines the function and a user interface portion that provides the user a way to test the function. For example, the structure portion may be stored as XML, and the user interface portion may be stored as HTML in the same file.

Some user defined functions may be executed by the client devices 102 thereby reducing communication with the server 110, 114. Other user defined functions may require server side execution. Preferably, a determination is made if a particular function is to be executed on the client side or the server side, and an indicator of this determination is stored with the function snippet. For example, user defined functions built from certain predefined primitives (e.g., add, multiply, loop, less than, etc.) may be determined to be executable by the client device 200, while other user defined functions that include database lookups (e.g., SQL statements) may be determined to be executable by a server 110, 114.

From a user's perspective, the data from the data sources 108 (as well as data calculated from data in the data sources 108 e.g., a discount) is viewed using one or more electronic forms 302, 310, 312. In addition, the user may manipulate the data and/or add data via the electronic forms 302, 310, 312. Forms 302, 310, 312 may be combined into pages 302 and one form may use data from more than one data source 108. For example, the customer orders page 302 combines the customer contact form 310 and the order list form 312 (as described in detail below with reference to FIG. 5). In addition, portions of forms and/or entire forms that are part of a larger page, may be locked so that only certain users can modify that portion of the form or page.

In order to facilitate forms 302, 310, 312 that combine data from different data sources 108, the system 300 employs an object broker process 304 (described in detail below with reference to FIG. 6) and a form process 326 (described in detail below with reference to FIG. 7). In one embodiment, the object broker process 304 is ASP code running on the object broker server 114 and the form process 326 is JavaScript running on a client device 102. The object broker process 304 compiles data in a variety of different native formats from the different data sources 108 into standardized business objects 306, 308 (e.g., XML files). In addition, the object broker process 304 accepts the data via the business objects 306, 308 and stores the data back to the data sources 108 in the correct native format.

More specifically, the object broker process 304 uses a plurality of broker services to communicate with the data sources 108. Preferably, one broker service is used for each data source 108. In this example, the object broker process 304 includes an ERP broker service 328, a CRM broker service 330, a custom broker service 332, an add-on broker service 334, and a function broker service 336. Each broker service 328, 330, 332, 334, 336 is designed to communicate with the associated data source 108 using the data source's native formats and protocols.

Each broker service 328, 330, 332, 334, 336 then automatically exposes the properties and methods of the associated data source 108 as standardized properties and methods 338 for use by the business objects 306, 308. For example, the ERP broker service 328 communicates with the ERP data source 314 via the BizTalk server 324 and exposes the ERP data source 314 properties and methods to the customer business object 306 and the order business object 308 as XML files. If new properties and/or methods become available from a data source 108, the associated broker service preferably detects these new properties and/or methods and automatically exposes the new properties and/or methods for use by the business objects 306, 308. The business objects 306, 308 may include some or all of the exposed properties and methods 338. Each business object 306, 308 then exposes its included properties and methods 340 to the form process 326.

The form process 326 calls business object methods 340 in response to form events and populates the forms 302, 310, 312 with data from the business object properties 340. For example, a user may press a "Load" button on the customer orders page 302, which causes the form process 326 to call one or more methods 340 exposed by the business objects 306, 308. This, in turn, causes the object broker process 304 to retrieve the appropriate data from one or more data sources 108. The data is then returned as properties of the business objects 306, 308, and the form process 326 uses the data to populate the forms 310, 312.

In addition, the form process 326 may store values to the business object properties 340, and call methods to have the new/modified data stored back to the appropriate data source 108 via the object broker process 304. For example, a form may accept a new value for a customer's address and call an UpdateContact method to have the new address stored to the appropriate data source 108.

Figure 4:
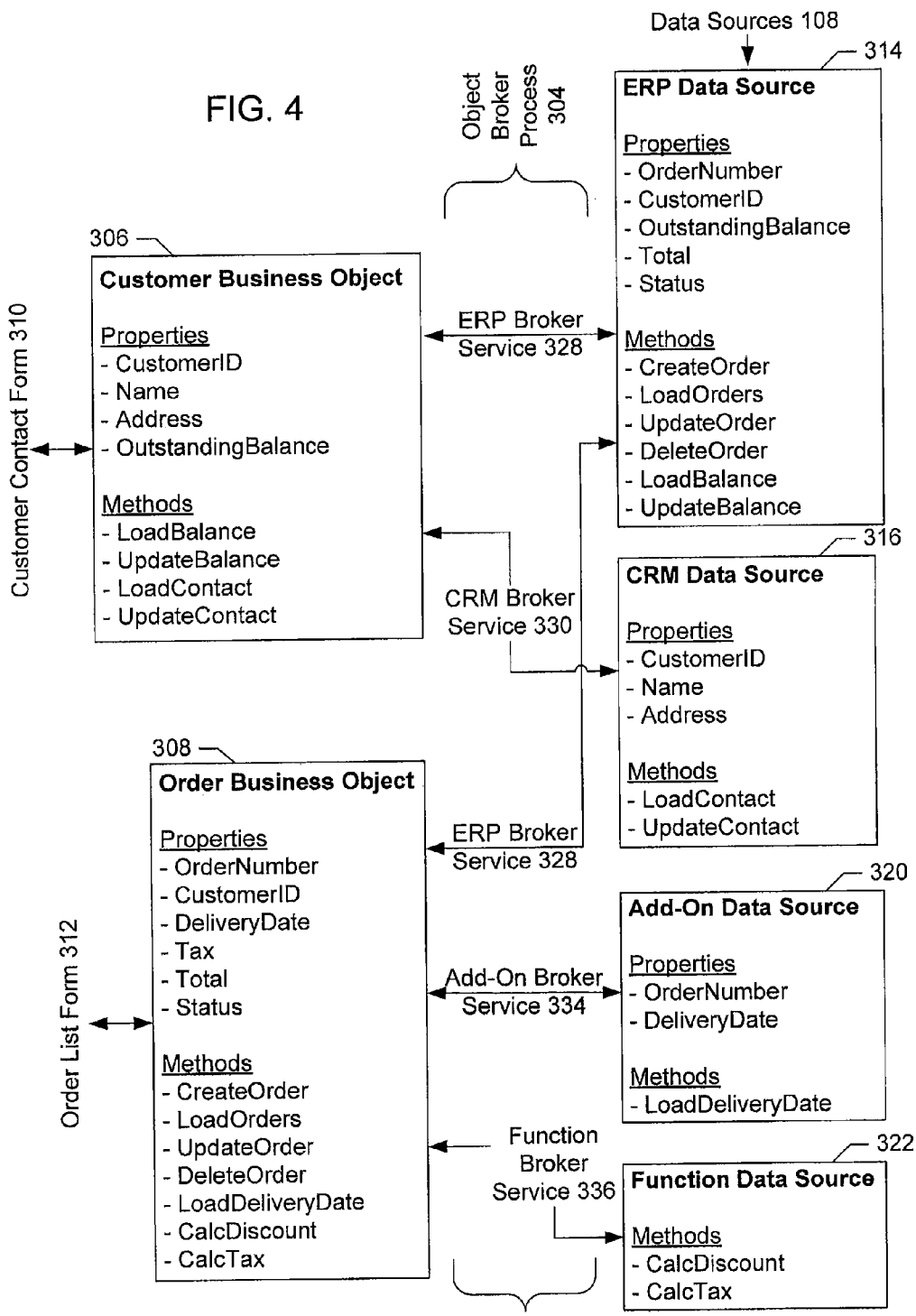
FIG. 4 is a block diagram showing example connections between data sources and business objects.

A more detailed block diagram showing these connections between the example data sources 108 and the example business objects 306, 308 is illustrated in FIG. 4. In this example, the customer business object 306 is connected to the ERP data source 314 and the CRM data source 316. The order business object 308 is connected to the ERP data source 314, the add-on data source 320, and the function data source 322. These logical connections may be defined in any suitable manner. For example, a graphical user interface may be used to allow a user to draw connection lines between graphical representations of the data sources 108 and graphical representations of the business objects 306, 308.

These logical connections are maintained by the object broker process 304. For example, data to populate the customer contact form 310 and the order list form 312 is brought into the customer business object 306 and the order business object 308 from the data sources 108 by the object broker process 304. Similarly, new and modified data from the customer contact form 310 and the order list form 312 is sent from the customer business object 306 and the order business object 308 to the data sources 108 by the object broker process 304. In addition, the role service 323 may generate a reduced object definition based on these full object definitions. For example, the role service 323 may retrieve a role associated with a particular user and a plurality of authorized properties and/or methods associated with that role. Unauthorized properties and/or methods are then removed from the business object definition (e.g., a user is not allowed to write to the customer business object, therefore the UpdateBalance and UpdateContact methods are removed).

The example customer business object 306 includes a customer ID property, a name property, an address property, an outstanding balance property, a load balance method, an update balance method, a load contact method, and an update contact method. The customer ID property in the customer business object 306 is connected to the customer ID property in the ERP data source 314 and/or the customer ID property in the CRM data source 316. The name property and the address property in the customer business object 306 are connected to the name property and the address property in the CRM data source 316. The outstanding balance property in the customer business object 306 is connected to the outstanding balance property in the ERP data source 314. The load balance method and the update balance method in the customer business object 306 are connected to the load balance method and the update balance method in the ERP data source 314. The load contact method and the update contact method in the customer business object 306 are connected to the load contact method and the update contact method in the CRM data source 316.

The example order business object 308 includes an order number property, a customer ID property, a delivery date property, a tax property, a total property, a status property, a create order method, a load orders method, an update order method, a delete order method, a calc discount method, and a calc tax method. The order number property and the status property in the order business object 308 are connected to the order number property and the status property in the ERP data source 314. The customer ID property in the order business object 308 is connected to the customer ID property in the ERP data source 314 and/or the customer ID property in the add-on data source 320. The delivery date property, tax property, and total property in the order business object 308 are connected to the delivery date property, tax property, and total property in the add-on data source 320. The create order method, load orders method, update orders method, and delete order method in the order business object 308 are connected to the create order method, load orders method, update orders method, and delete order method in the ERP data source 314. The calc discount method and the calc tax method in the order business object 308 are connected to the calc discount method and the calc tax method in the function data source 322. It will be appreciated that the names of the properties and/or methods in the data sources 108 need not be the same as the corresponding names of the properties and/or methods in the business objects 306, 308.

Figure 5:
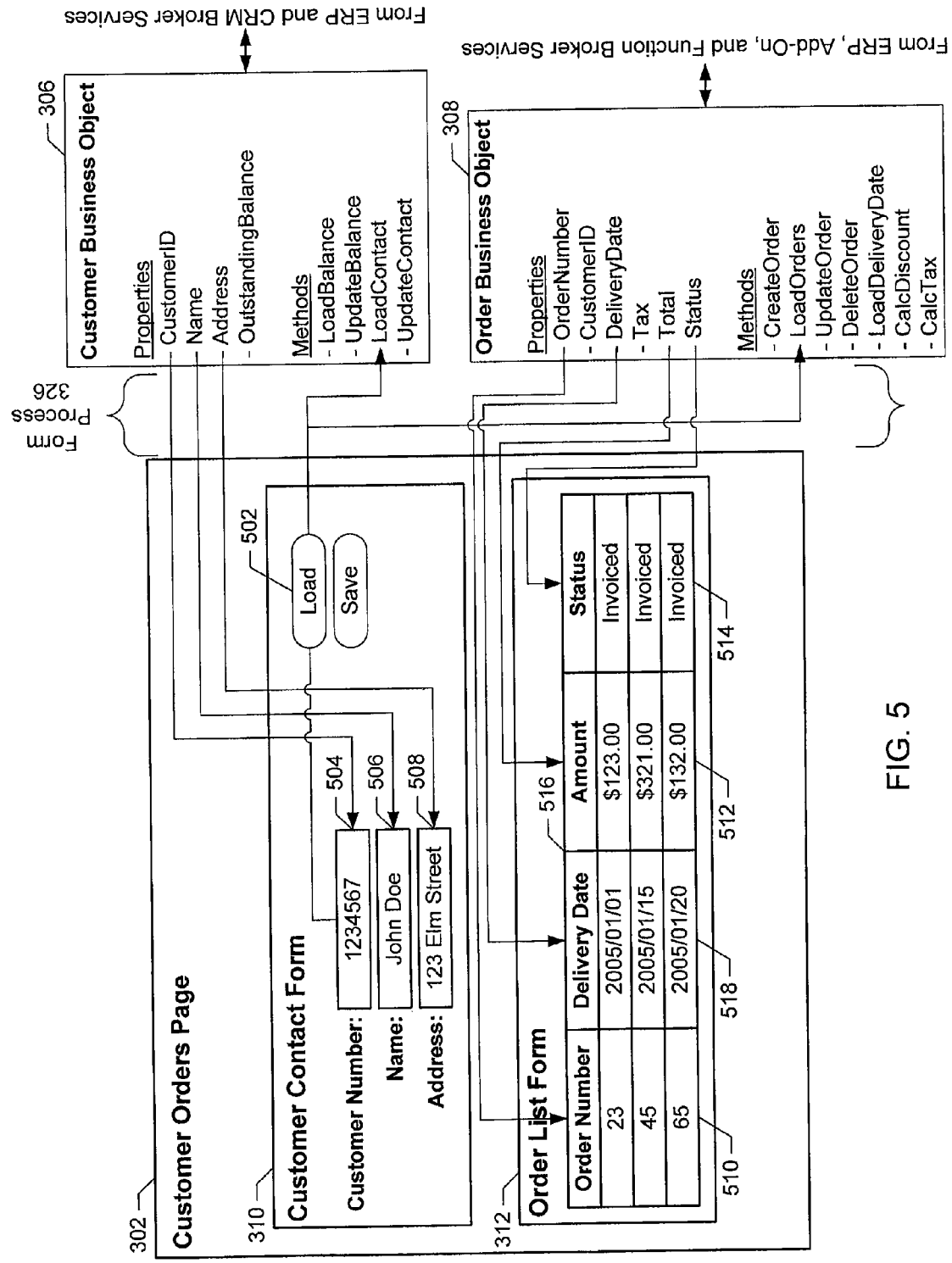
FIG. 5 is a more detailed view of an example customer orders page and the associated connections to a customer business object and an order business object.

A more detailed view of the customer orders page 302 and the associated connections to the customer business object 306 and the order business object 308 are illustrated in FIG. 5. In this example, if the user presses a load button 502, binder software associated with the form process 326 calls the load contact method of the customer business object 306 and the load orders method of the order business object 308. For both method calls, the form process 326 supplies the value of the customer number field 504 from the customer contact form 310. Alternatively, the form process 326 may obtain the value of the customer number field 504 from the customer ID property of the customer business object 306 and/or the order business object 308. These logical connections may be defined in any suitable manner. For example, a graphical user interface may be used to allow a user to draw connection lines between the forms 302, 310, 312 and graphical representations of the business objects 306, 308. Preferably, the user may design forms using only a web browser. For example, an asynchronous Java and XML (AJAX) interface may be used.

When the form process 326 calls the load contact method of the customer business object 306 with the value of the customer number field 504 as a parameter (e.g., using AJAX), the object broker process 304 translates the method call into the native language of the associated data source 108 and retrieves the associated data from the data source 108 in its native format. Specifically, the CRM broker service 330 invokes the native load contact method of the CRM data source 316 and receives the contact's name and address back from the CRM data source 316. The CRM broker service 330 then stores the name and contact data to the customer business object 306. For example, the CRM broker service 330 may be ASP code running on the object broker server 114 that sends an XML file (or another standardized file) to the form process 326, which is JavaScript code running on the client device 102 that is displaying the customer contact form 310. Once the customer business object 306 is updated with the new name and address data, the form process 326 populates the name field 506 and the address field 508 of the customer contact form 310. Using this method, an HTML form may be updated without posting the entire form to a server and re-rendering the entire HTML form.

Similarly, when the form process 326 calls the load orders method of the order business object 308 with the value of the customer number field 504 as a parameter, the object broker process 304 translates the method call into the native language of the associated data source 108 and retrieves the associated data from the data source 108 in its native format. Specifically, the ERP broker service 328 invokes the native load orders method of the ERP data source 314 and receives a list of order numbers, an associated list of totals, and an associated list of statuses back from the ERP data source 314. For example, the data may be returned as a database table. These values will eventually be used to fill out the order number column 510, the amount column 512, and the status column 514 of the order table 516 in the order list form 312. However, in this example, the delivery date column 518 cannot be supplied by the ERP data source 314, because the ERP data source 314 does not have this information.

The delivery date data is stored in the add-on data source 320 (i.e., the delivery date field was added later by the user). Accordingly, when the form process 326 calls the load orders method of the order business object 308 with the value of the customer number field 504 as a parameter, the add-on broker service 334 invokes the load delivery date method of the add-on data source 320 and receives a list of delivery dates and associated order numbers back from the add-on data source 320. The object broker process 304 and/or the form process 326 correlate the delivery dates with the amount data and status data received from the ERP data source 314 using the order number data that is common to both lists.

The object broker process 304 then stores the list of order numbers, the associated list of delivery dates, the associated list of totals, and the associated list of statuses to the order business object 308. For example, the ERP broker service 328, the add-on broker service 334, and/or other software (e.g., ASP code running on the object broker server 114) may send an XML file (or another standardized file) to the form process 326 (e.g., JavaScript running on the client device 102). Once the order business object 308 is updated with the new data, the form process 326 populates the order table 516 in the order list form 312.

Figure 6:
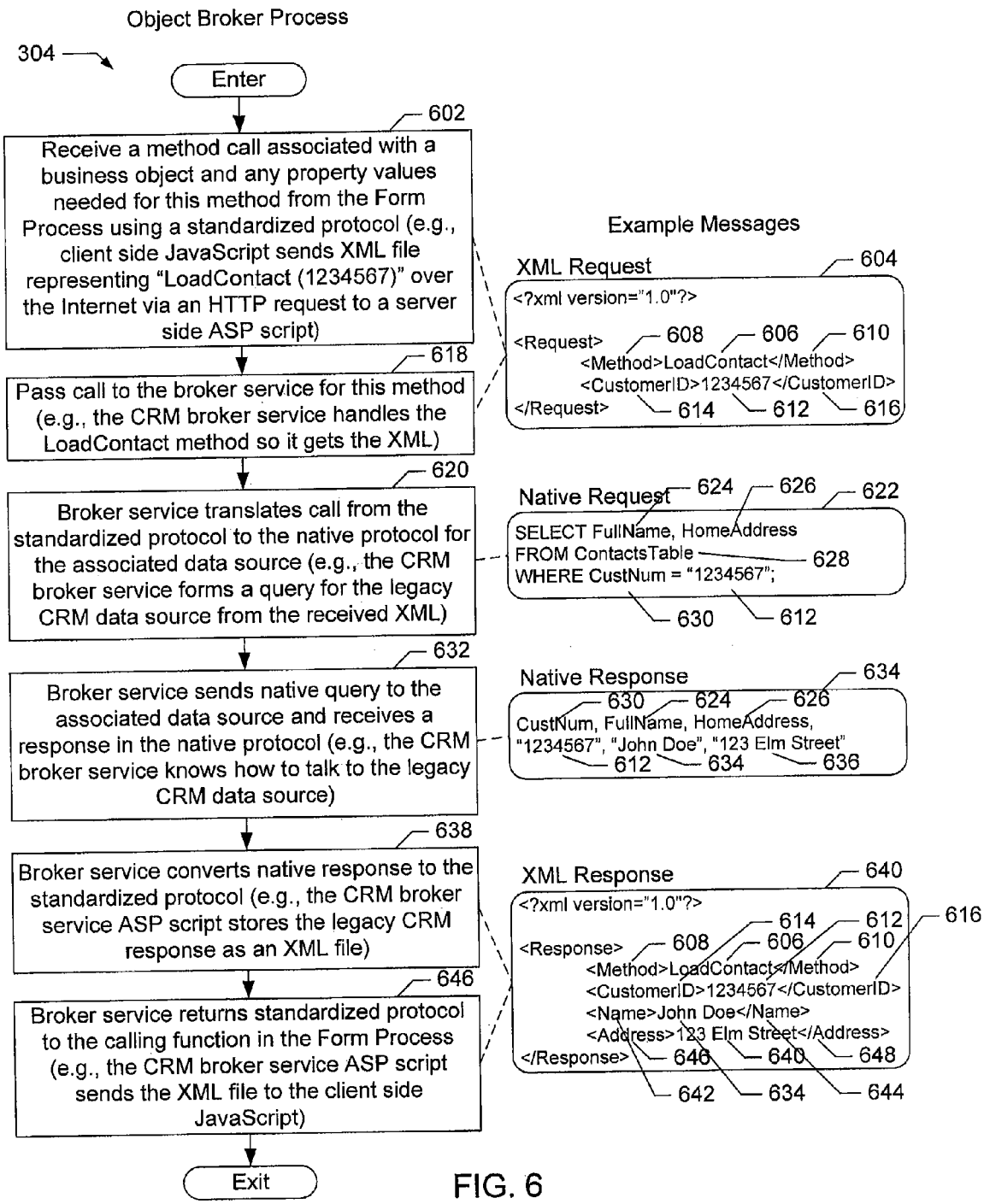
FIG. 6 is a flowchart of an example object broker process.

A flowchart of an example object broker process 304 is illustrated in FIG. 6. Preferably, the object broker process 304 is embodied in one or more software programs which is stored in one or more memories and executed by one or more processors. For example, the object broker process 304 may be ASP code (or any other type of software) running on the object broker server 114. Although the object broker process 304 is described with reference to the flowchart illustrated in FIG. 6, it will be appreciated that many other methods of performing the acts associated with object broker process 304 may be used. For example, the order of many of the steps may be changed, and some of the steps described may be optional.

Generally, the object broker process 304 receives standardized method calls from the form process 326 and converts the standardized method calls into native method calls. The object broker process 304 then sends the native method calls to the associated data source(s) 108 and receives one or more native responses from the data source(s) 108. The object broker process 304 then converts the native response(s) to standardized response(s) and sends the standardized response(s) to the calling form process 326.

More specifically, the object broker process 304 receives a method call from the form process 326 using a standardized protocol (block 602). The standardized method call is associated with a business object and includes any property values (i.e., parameters) needed for this method. For example, a client device 102 may be displaying the customer orders page 302 as an HTML document. Using an onBlur event trigger, the client device 102 may run JavaScript code that sends an XML file 604 representing "LoadContact(1234567)" over the Internet 116 via an HTTP request to an ASP script running on the object broker server 114. It will be appreciated that any suitable protocols may be used instead of HTML, JavaScript, XML, HTTP, and/or ASP. For example, VBScript may be used instead of JavaScript, and Perl may used instead of ASP.

The example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The object broker process 304 then passes the standardized method call to the broker service associated with the method call (block 618). For example, the object broker process 304 may send the XML file 604 containing the LoadContact method 606 call to the CRM broker service 330.

The broker service associated with the method call then translates the method call from the standardized protocol to the native protocol for the associated data source 108 (block 620). For example, the CRM broker service 330 may form a native request 622 for the CRM data source 316 from the received XML file 604. The native request 622 may use any protocol. For example, the native request 622 may be a SQL query that knows the CRM data source 316 holds the customer contact data in a "FullName" field 624 and a "HomeAddress" field 626 of a "ContactsTable" 628 indexed by a "CustNum" field 630.

The broker service associated with the method call then sends the native query to the associated data source 108 and receives a native response from the data source 108 (block 632). For example, the CRM broker service 330 may be an ASP script running on the object broker server 114 that sends the native request 622 to the CRM data source 316 as a SQL query and receives a native response 634 in the form of a comma-delimited list. In this example, the native response 634 includes the name value 634 and the address value 636 of the contact associated with the "CustomerID" property value 612.

The broker service then converts the native response back to the standardized protocol (block 638). For example, the CRM broker service 330 may wait for a SQL response from the CRM data source 316 and generate an associated XML response 640. In this example, the XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648.

The broker service then sends the standardized response to the calling function in the form process 326 (block 646). For example, the CRM broker service 330 may send the XML response 640 to a JavaScript associated with the customer orders page 302 on a client device 102. As described below, the form process 326 may then use the XML response 640 to populate the HTML based customer orders page 302.

Figure 7:
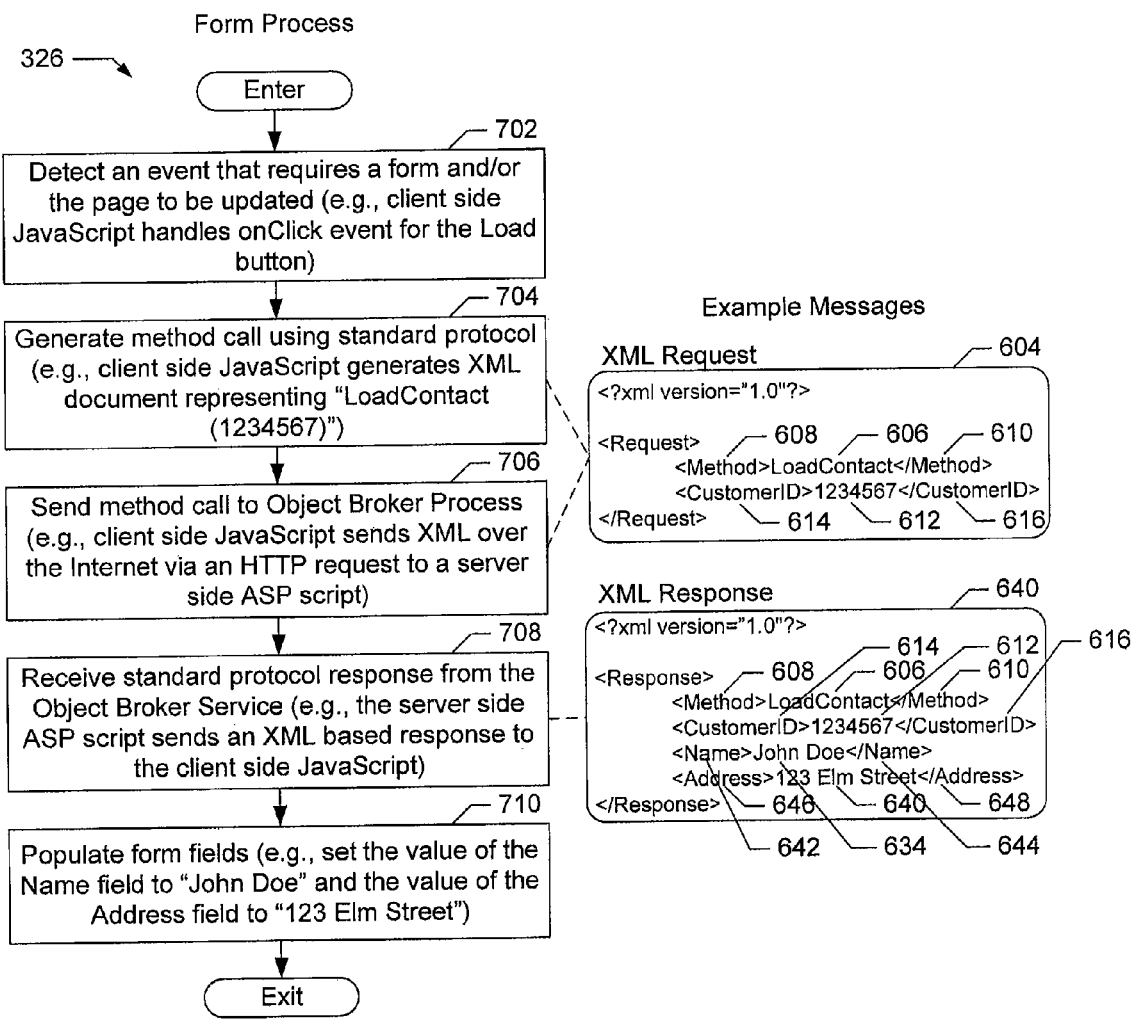
FIG. 7 is a flowchart of an example form process.

A flowchart of an example form process 326 is illustrated in FIG. 7. Preferably, the form process 326 is embodied in one or more software programs which is stored in one or more memories and executed by one or more processors. For example, the form process 326 may be JavaScript code (or any other type of software) running on a client device 102. Although the form process 326 is described with reference to the flowchart illustrated in FIG. 7, it will be appreciated that many other methods of performing the acts associated with form process 326 may be used. For example, the order of many of the steps may be changed, and some of the steps described may be optional.

Generally, the form process 326 detects events associated with a form (e.g., the HTML customer orders page 302) and sends standardized method calls (e.g., XML request 604) to the object broker process 304. When the form process 326 receives the standardized response(s) (e.g., XML response 640) back from the object broker process 304, the form process 326 may then use the standardized response(s) to populate the form (e.g., the HTML customer orders page 302).

More specifically, the form process 326 detects an event that requires a form and/or page to be updated (block 702). For example, the form process 326 may be JavaScript code running on a client device 102 in association with the customer orders page 302. When a user presses the load button 502 on the customer contact form 310, the form process 326 detects the onClick event associated with the load button 502 and executes a portion of the JavaScript code associated with this onClick event (i.e., the event handler).

When the event handler is executed, the form process 326 generates a suitable method call in the standard protocol (block 704). For example, the client device 102 may run JavaScript code that generates the XML file 604 representing "LoadContact(1234567)". As described above, the example XML request 604 includes the "LoadContact" method call 606 delimited by an opening "Method" tag 608 and a closing "Method" tag 610. In addition, the example XML request 604 includes the "CustomerID" property value 612 delimited by an opening "CustomerID" tag 614 and a closing "CustomerID" tag 616.

The form process 326 then sends the standardized method call to the object broker process 304 (block 706). For example, the client device 102 may send the XML request 604 over the Internet 116 via an HTTP request to an ASP script running on the object broker server 114. The object broker process 304 then communicates with the associated data sources 108 using the native protocols and sends the form process 326 a standardized response (block 708). For example, the client side JavaScript associated with the form process 326 may receive the XML response 640 from the server side ASP script associated with the object broker process 304.

As described above, the example XML response 640 includes all of the information from the original XML request 604 (i.e., the "LoadContact" method call 606 delimited by an opening "Method" tag 608 and a closing "Method" tag 610 and the "CustomerID" property value 612 delimited by an opening "CustomerID" tag 614 and a closing "CustomerID" tag 616). In addition, the XML response 640 includes the name value 634 delimited by an opening "Name" tag 642 and a closing "Name" tag 644, as well as the address value 640 delimited by an opening "Address" tag 646 and a closing "Address" tag 648. The form process 326 may then use the standardized response to populate the client's form (block 710). For example, the client side JavaScript may populate the name field 506 and the address field 508 of the HTML based customer contact form 310.

Figure 8:
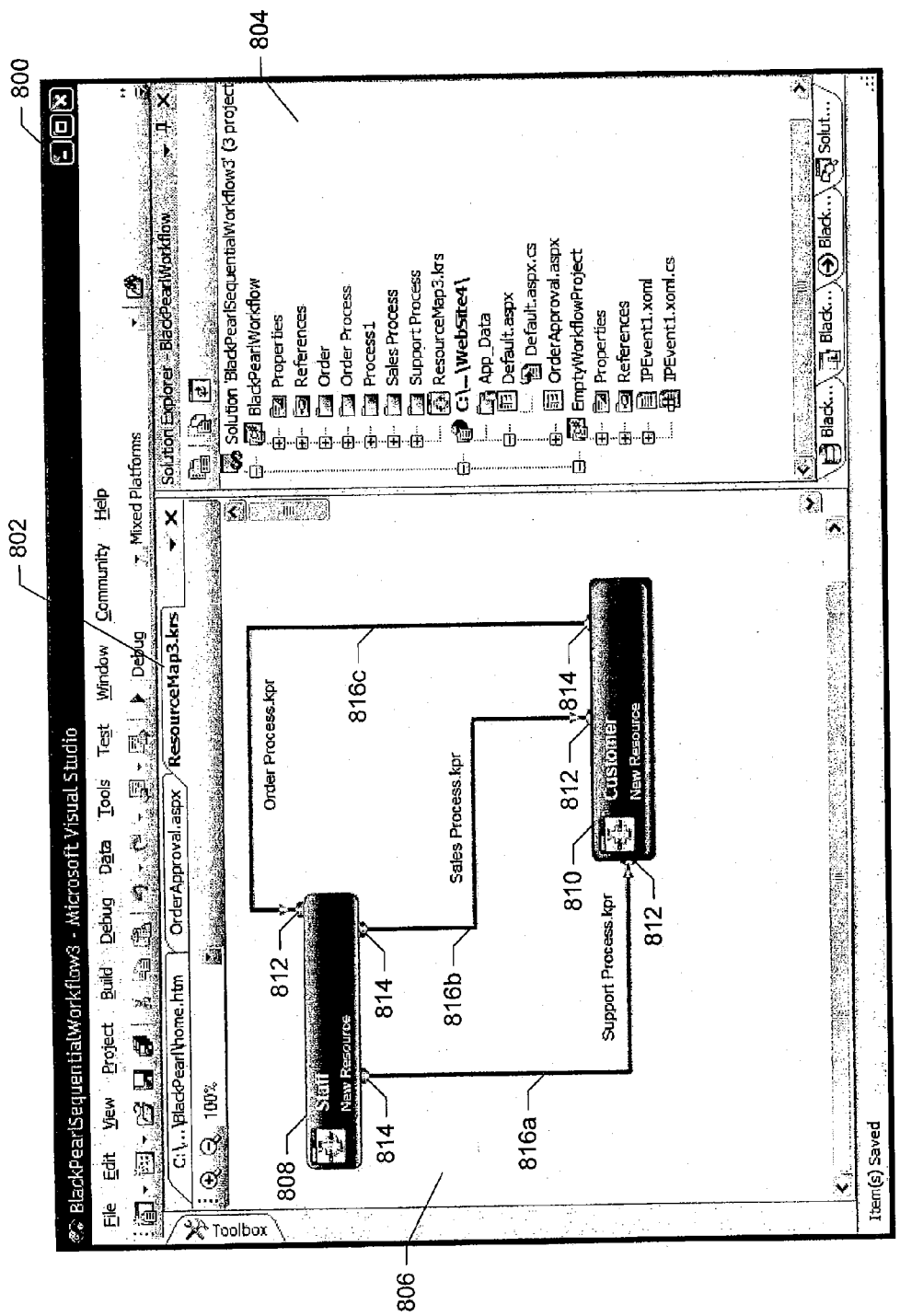
FIG. 8 is a screenshot of an example workflow design tool that allows a user to define a resource map.

A workflow design tool 800 that allows a user to define a resource map 802 is illustrated in FIG. 8. In this example, the workflow design tool 800 includes a file explorer section 804 and a design canvas 806. The file explorer section 804 allows the user to find and organize a plurality of files associated with the work flow. The design canvas 806 allows the user to draw a graphical representation of the resource map 802. In this example, a resource map 802 is shown that includes a staff object 808 and a customer object 810. The staff object 808 and the customer object 810 each include one or more input nodes 812 and one or more output nodes 814. Input nodes 812 are connected to output nodes 814 by process arrows 816. In this example, a support process 816a and a sales process 816b each come out of the staff object 808 and into the customer object 810. Similarly, an order process 816c comes out of the customer object 810 and into the staff object 808.

By defining workflows in terms of known resources (e.g., the staff object 808 and the customer object 810) and the interactions between those resources (e.g., the customer object 810 needs support from the staff object 808), the workflow designer can discover and design each process by starting at a high level and drilling down to underlying processes and automated workflows.

The resource maps 802 also allow for business object inheritance to show classes of a business object and that business object's child objects. Child objects may be associated with parent objects by modifying properties associated with the parent object and/or adding properties to the parent object. A single parent/child object combination might have a unique link definition within another resource on the canvas. For example, the parent customer object 810 may include a government customer child object and a commercial customer child object. The sales process 816b between the staff object 808 and the customer object 810 may be different depending on the type of customer object 810 (i.e., one sales process 816b for government customer's 810 and another sales process for commercial customers 810). Similarly, the staff object 808 may be a parent object with sales staff and support staff as two child resources.

Figure 9:
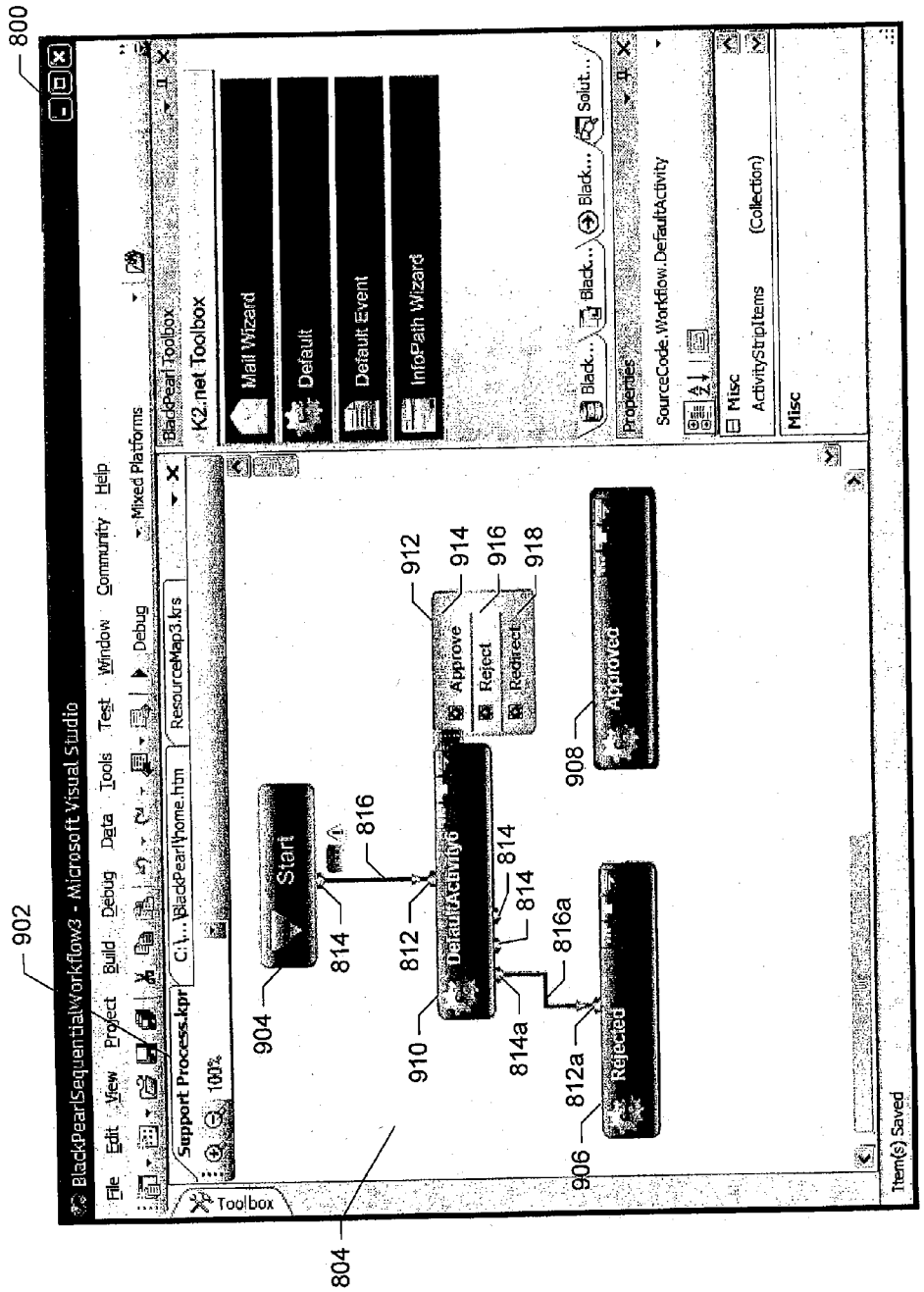
FIG. 9 is a screenshot of an example workflow design tool that allows a user to define a process map.

Another view of the workflow design tool 800 is illustrated in FIG. 9. In this view, the workflow design tool 800 is used to create a process map 902. In this example, the support process 816a is being defined. The example support process 816a includes a start step 904, a rejected step 906, and an approved step 908. In this example, only one of these steps 904, 906, 908 is to be performed. Accordingly, a new step 910 is being placed to select one of the three steps 904, 906, 908. The new step 910 includes a plurality of actions 912 and a plurality of corresponding output nodes 814. In this example, the new step 910 includes an approve action 914, a reject action 916, and a redirect action 918. The user connects the rejected output node 814a to the input node 812a of the rejected step 906 by dragging the process connector 816d. The associated line logic is automatically configured for the user.

Figure 10:
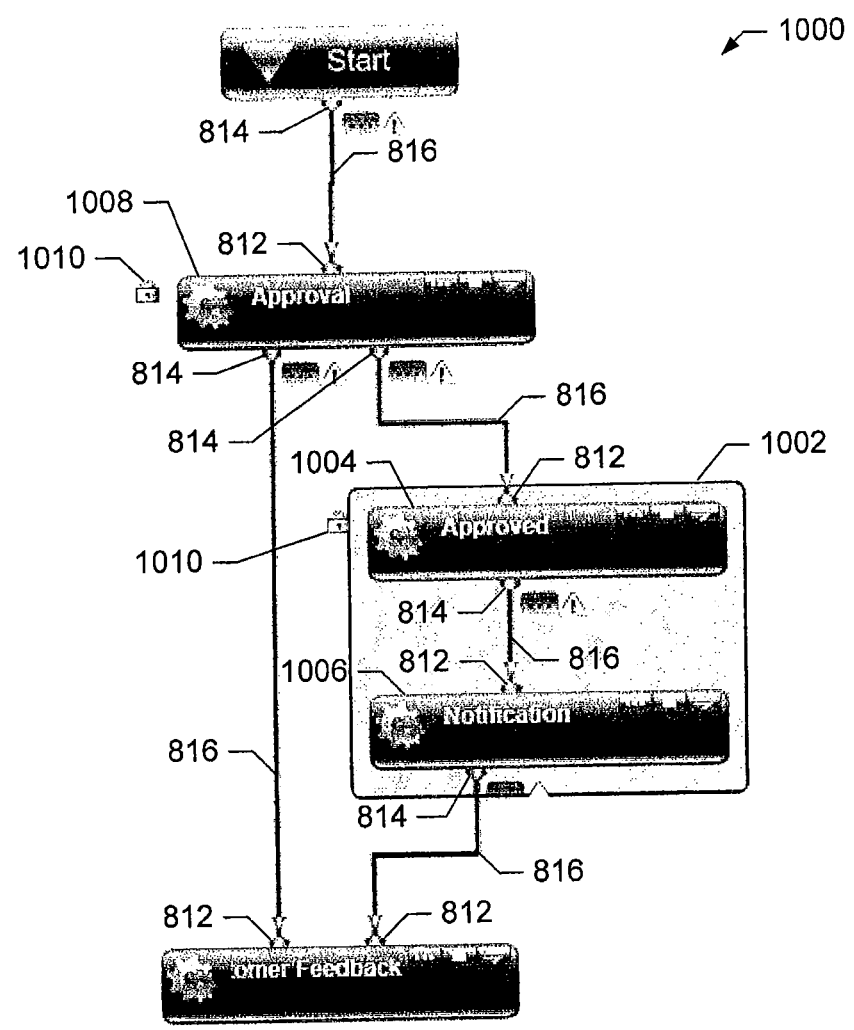
FIG. 10 is an example process map with a localized region of the process map highlighted.

Another process map 1000 is illustrated in FIG. 10. In this example process map 1000, a portion 1002 of the process map 1000 is highlighted. Specifically, an approved step 1004 and a notification step 1006 are included in a highlighted portion 1002. This portion 1002 may define a localized region of the process map 1000 while other portions of the process map 1000 (e.g., the rest of the process map 1000 in this example) are considered global regions. Using process inheritance, this localization of certain process regions allows a process owner to stay in control of the global process and still allow other users to customize certain portions 1002. For example, the global process may determine when something is approved and where the notification is routed, but one office in an organization may perform one set of actions in response to the approval and another office in the organization may perform another set of actions in response to the approval. Local processes may even include additional process steps that are specific to the localized region. The process 1000 is maintained under a single process definition such that changes to the global portion are automatically applied to all instances of the process 1000 and changes to the local portion 1002 are only applied to the associated localities.

In addition, individual process steps and/or portions 1002 may be locked. In this example, an approval step 1008 is individually locked, and the local portion 1002 is also locked. Each locked step and each locked portion includes a lock icon 1010 to indicate a locked status. By locking a process step 1008 and/or a process portion 1002, process designers can limit another user's ability to change certain configuration settings, add or remove dependencies, etc. from the defined and locked logic. The locking attributes can also be manipulated by wizards and templates in a programmatic way, allowing lower level building blocks to hide or lock their implementation logic.

A collaborative framework allows any process designer working within the workflow design tool 800 to visually share his design canvas 806 with another user across the network 116. A process designer can also initiate a voice or text conversation with the other parties to discuss the process currently being designed. In this manner, the process designer may involve other users in the process design using collaboration and application sharing tools. For example, by right clicking on the design canvas 806, the process designer may contact a particular person in the accounting department to ask that person who should be notified when a purchase is approved. Text messages and/or voice recordings between collaborators may also be saved to a database for later review. For example, when a process is being evaluated for redesign, the process designer may listen to a collaboration conversation to determine why a particular step was implemented the current way.

Figure 11:
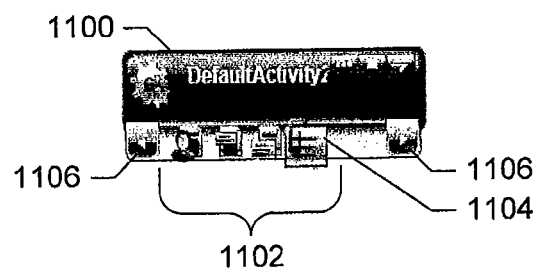
FIG. 11 is a screenshot of an example activity strip.

Each step in the graphical representation of process preferably includes an activity strip. An example activity strip 1100 is illustrated in FIG. 11. In this example, the activity strip 1100 includes one or more event icons 1102 that represent the events associated with the process step. For example, the user may drag a send e-mail event into a process step. In such an instance, an e-mail event icon 1104 is added to the activity strip 1100. If the number of event icons 1102 exceeds the width of the activity strip 1100, the user may scroll through event icons using arrow buttons 1106.

Figure 12:
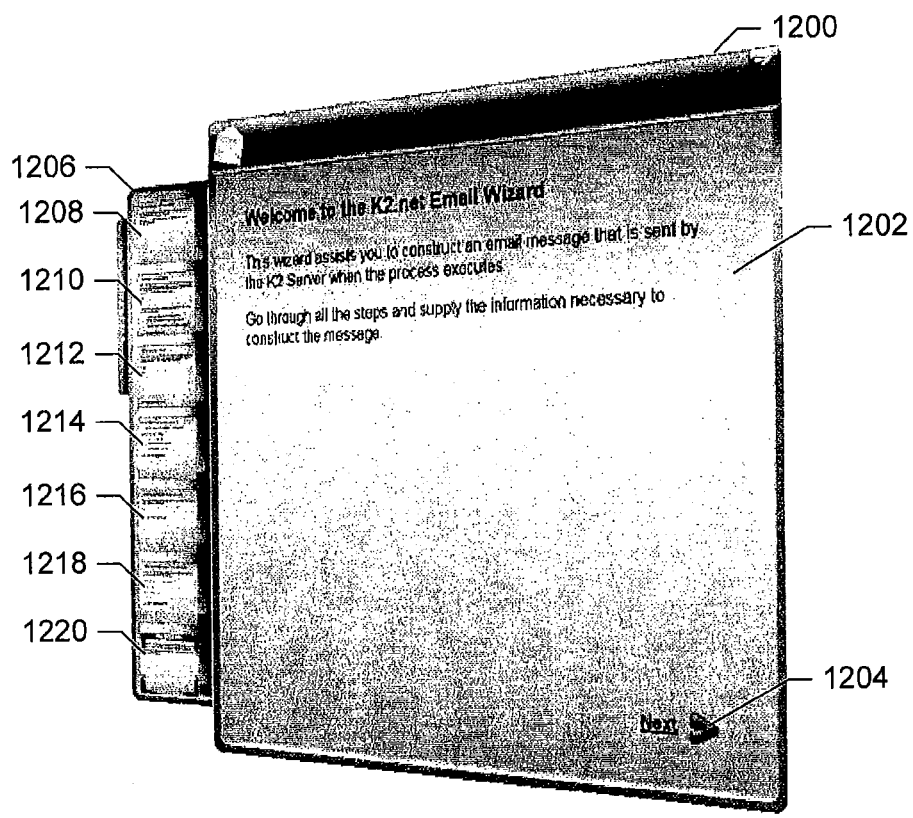
FIG. 12 is a screenshot of an example setup wizard in a partially rotated state.
Figure 13:
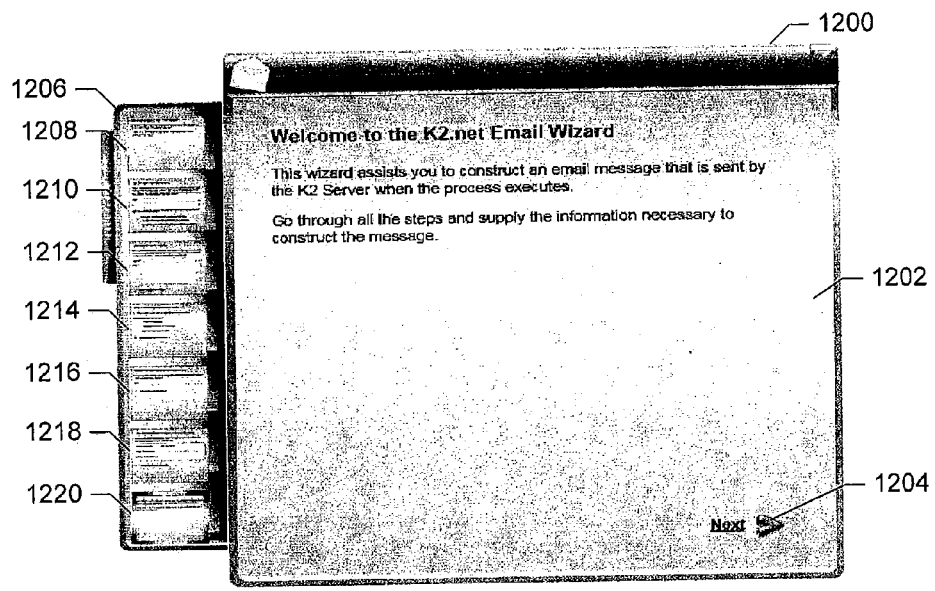
FIG. 13 is a screenshot of the example setup wizard in a fully rotated state.

When a particular event icon 1102 is selected, the user is shown a setup wizard to configure that portion of the process. Preferably, each step in a process is presented as a cube to the user, and the setup wizard is swiveled into view to create an effect of a single entity that the user is working on. For example, when a user presses the e-mail event icon 1104, the activity strip 1100 rotates into an e-mail event setup wizard 1200. A partially rotated view of an example e-mail event setup wizard 1200 is illustrated in FIG. 12. A fully rotated view of the same setup wizard 1200 is illustrated in FIG. 13. The e-mail setup wizard 1200 may be used to design dynamically constructed e-mails used by one or more workflow processes. For example, the notification step 1006 of the approval process 1000 illustrated in FIG. 10 includes an output 814 that may be an automatic e-mail message. The e-mail setup wizard 1200 may be used to design how that e-mail message is constructed.

The e-mail setup wizard may use a reference wizard, which allows a user to use a process while designing another process. For example, a reference wizard may allow a user to call any method in any .NET assembly, Web service or WCF service as part designing a process.

Preferably, the setup wizard 1200 includes a main display portion 1202 and a next button 1204. The main display portion 1202 displays one page of the setup wizard 1200. The next button 1204 advances the main display portion 1202 to the next page of the setup wizard 1200. A previous button (not shown) changes the main display portion 1202 to display the previous page of the setup wizard 1200.

The setup wizard 1200 also includes a page palette 1206. The page palette 1206 includes a plurality of thumbnails 1208 to 1220. Each of the thumbnails 1208 to 1220 represents one of the pages in the setup wizard 1200. The user may quickly jump to any page in the setup wizard 1200 by clicking the associated thumbnail. When a user jumps to a particular page in the setup wizard 1200, the main display portion 1202 is redrawn to reflect that page.

Figure 14:
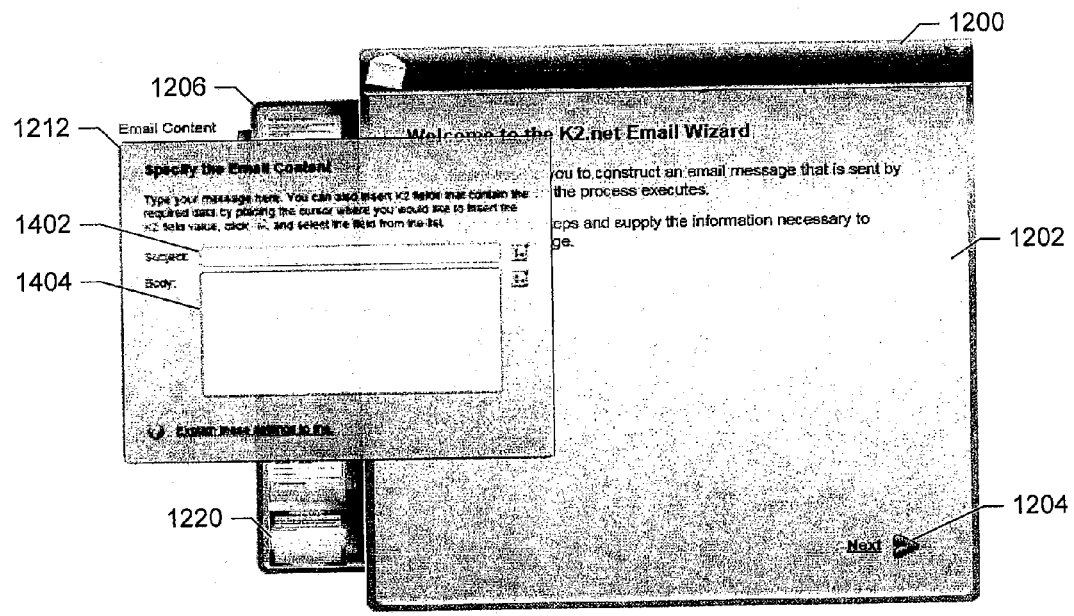
FIG. 14 is a screenshot of the example setup wizard with a popup window.

In addition, the user may quickly view a popup of any page in the setup wizard 1200 without jumping to that page (i.e., without drawing the page contents in the main display portion 1202) by hovering a cursor over the associated thumbnail. For example, the third page 1212 of the example e-mail setup wizard 1200 is displayed as a popup in FIG. 14. In this example, the third page 1212 of the setup wizard 1200 includes a subject input box 1402 and a body input box 1404. The subject input box 1402 of the e-mail setup wizard 1200 is used to define the subject line of the automatic e-mail. The body input box 1404 of the e-mail setup wizard 1200 is used to define the body of the automatic e-mail. Any values entered into a page of the process setup wizard 1200 are visible in the popup view. For example, if the user had entered "Approval Report" in the subject input box 1402 of the third page 1212 of the e-mail setup wizard 1200, "Approval Report" would be visible in the subject input box 1402 of the popup window. In this manner, the user can enter values on different pages of the setup wizard 1200 that are consistent with other entries without the need to remember those other entries and/or leave the current page.

Figure 15:
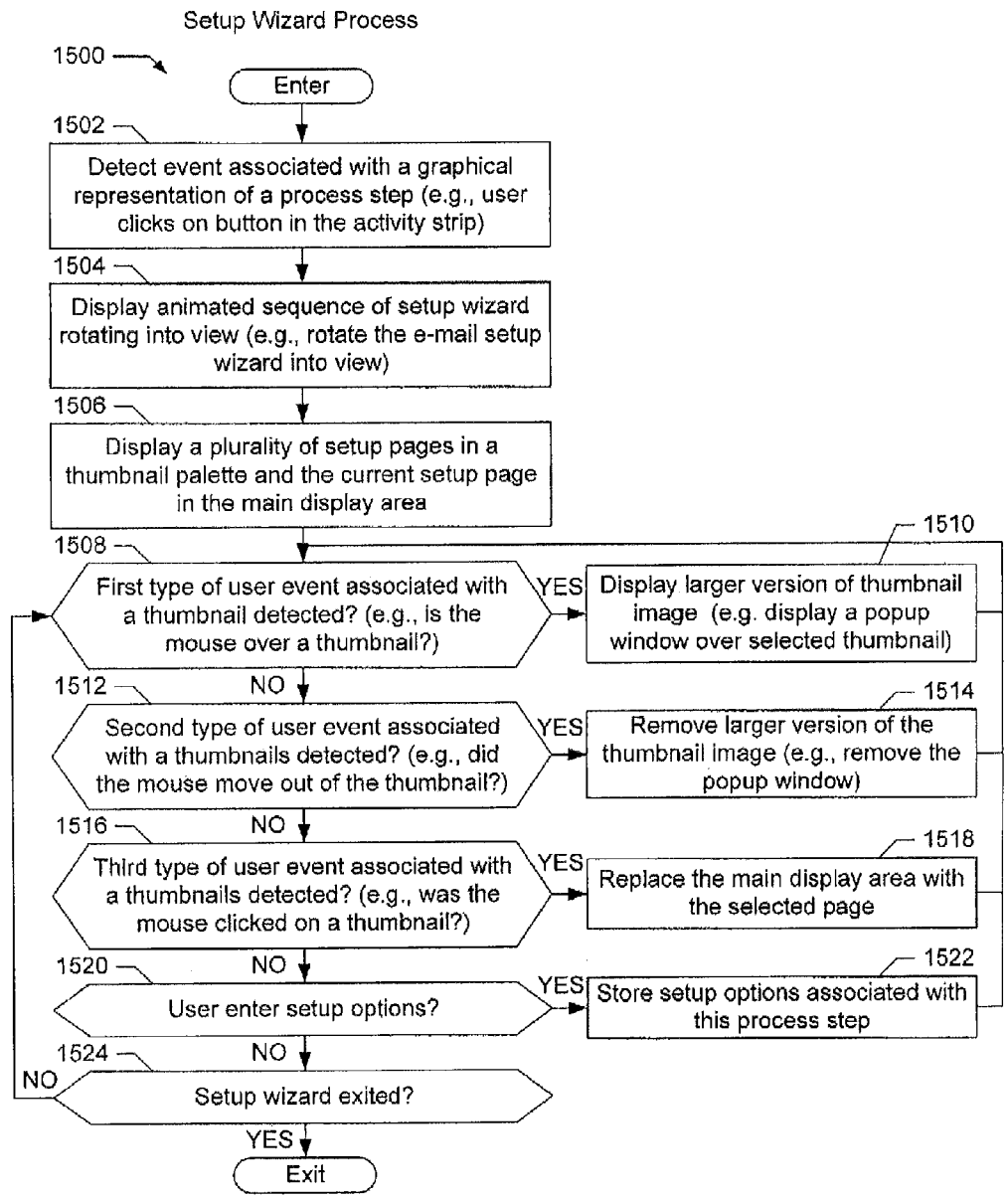
FIG. 15 is a flowchart of an example setup wizard process.

A flowchart of an example setup wizard process 1500 is illustrated in FIG. 15. Preferably, the setup wizard process 1500 is embodied in one or more software programs which is stored in one or more memories and executed by one or more processors. Although the setup wizard process 1500 is described with reference to the flowchart illustrated in FIG. 15, it will be appreciated that many other methods of performing the acts associated with setup wizard process 1500 may be used. For example, the order of many of the steps may be changed, and some of the steps described may be optional.

The process 1500 begins when a client device 102 detects an event associated with a graphical representation of a process step 1008 (block 1502). For example, the user may click on a setup button in the activity strip 1100. In response, the client device 102 causes an animated sequence to be displayed (block 1504). For example, the client device may display the activity strip rotating in three dimensions to show an e-mail setup wizard "side" of a cube. In this manner, the user is given visual feedback that the two objects (e.g., the activity strip 1100 and the e-mail setup wizard 1200) are related.

The setup wizard includes a plurality of setup pages in a thumbnail palette 1206 and a current setup page in a main display portion 1202 (block 1506). For example, the first page of an e-mail setup wizard may ask the user to enter the e-mail address of the recipient and the subject of the e-mail message. While the client device 102 is displaying setup wizard pages and receiving setup information from the user, the client device 102 is also looking for a plurality of events such as mouse movements and mouse clicks.

If a first type of event associated with one of the thumbnail images 1208-1220 is detected (block 1508), the client device 102 preferably displays a larger version of the associated thumbnail image (block 1510). For example, if the user moves the mouse cursor over a particular thumbnail image 1208-1220, a popup window 1212 showing a larger version of that thumbnail image may be displayed. Preferably, the larger version of the thumbnail image is a separate window 1212 that is smaller than the main display portion 1202 (see FIG. 14). However, any type of suitable image may be used. For example, the larger version of the thumbnail image may "temporarily" replace the main display portion 1202.

If a second type of event associated with one of the thumbnail images 1208-1220 is detected (block 1512), the client device 102 preferably removes the larger version of the associated thumbnail image (block 1514). For example, if the user moves the mouse cursor out of a particular thumbnail image, the popup window showing the larger version of that thumbnail image may be removed. If the larger version of the thumbnail image is a separate window, that window is removed from the display and the content "beneath" the removed window is redrawn. If the larger version of the thumbnail image replaced the main display portion 1202, then the previous contents of the main display portion 1202 (e.g., the current setup page) is redrawn in the main display portion 1202.

The larger version of the thumbnail image also shows any setup information previously entered by the user. For example, if the user entered the recipients e-mail address on the first page of the setup wizard, moved to another page of the setup wizard, and then wanted to recall the entered e-mail address without scrolling all the way back to the first page, the user may simply roll the mouse over the first thumbnail to recall the entered information.

If a third type of event associated with one of the thumbnail images 1208-1220 is detected (block 1516), the client device 102 preferably replaces the main display image with a full size version of the associated thumbnail image (block 1518). For example, if the user clicks the mouse on a particular thumbnail image, the main display portion 1202 preferably jumps to that page in the setup wizard. Unlike the mouse over example, removing the mouse from the thumbnail does not revert the main display portion 1202 to the previous page (i.e., the user has moved to that setup page as opposed to just temporally reviewing that setup page).

At any time, the user may enter one or more setup options (block 1520), and the setup options are stored (block 1522). If the user exits the setup wizard (block 1524), the process 1508-1520 of checking for user actions and setup options repeats.

Even though the dynamic business object can be a useful tool in today's organizations, once a dynamic business object has been created, it cannot be easily accessed and consumed by remote client devices. Some existing technologies require that before the business object can be consumed through existing web service technologies, an endpoint must be defined. An endpoint is used to specify the interaction requirements between the client device and the business object. For example, the client device sends a message to the business object's endpoint when it wants to use the business object, and the message is formatted according to information specified by the endpoint. A business object may have multiple endpoints that allow different ways for clients to consume that object. Other existing technologies may provide a default endpoint where the user cannot configure any of the parameters or settings of the endpoint.

Typically, an endpoint is defined by an address, a binding, and a contract. An address is the location where the endpoint resides. A binding specifies how a business object can be consumed, such as, for example, protocol or encoding information. A contract for each object lists the operations exposed by the business object. All of this information must be specified before a business object can be used by a remote client device.

Today's existing approaches present several problems. In some cases, the contract must be manually generated for each object. Because the endpoint includes the contract, the endpoint is also manually generated for each object. Manual generation of a contract (and thus the endpoint) can be expensive and time-consuming and is susceptible to user error. Further, the endpoint can become stale if it is not updated as soon as the business object is updated and the user may rely on endpoint information that does not accurately represent the business object.

The present system makes business objects available to clients through endpoints, where the endpoints are dynamically generated. Thus, there is no need to manually generate an endpoint. The endpoints may be stored on a server. Endpoints associated with objects are automatically generated when the business objects are created, or the endpoints may be created when the business object is requested. In one embodiment, the endpoints are generated based on configuration criteria that allows the user to apply various levels of isolation to the endpoints as explained below. Whether or not configuration criteria is used, there is no need to manually generate endpoint information because the endpoint is automatically generated when the business object is requested by a client device or created. Client devices can communicate with the dynamic endpoint and use contracts associated with the business objects as though the contracts had been generated manually. The business object properties may be exposed through data contracts and business object methods may be exposed through operation contracts.

The present system frees resources and improves efficiency because new objects can be designed, deployed and consumed without the need to generate endpoints. Client devices are only required to know about and connect to the dynamic endpoint. Client devices can thus use objects without any prerequisite contract generation, construction, or publication. The endpoint information, such as a contract, is generated by the same service that created the business objects. Thus, the endpoint information is complete and compatible with the business object, and requires no additional involvement by a programmer or programming tools. Further, because the endpoint is generated when the business object is created or requested, the endpoint can allow integration with new environments that did not exist when the business object was designed.

In one embodiment, a business object may be periodically updated to create new versions. With static contracts, each new version of the business object would require updating the contract on the server so that clients may consume the business object. Otherwise, the contract (or the endpoint information) becomes stale and the client no longer has the most recent or accurate contract to consume the business object. This problem is avoided in the present system through the use of contracts that are dynamically generated. Because the present system uses dynamic contracts, the contract is never stale. If the business objects are modified, the contract is automatically modified or updated. The client device or consumer continues to point to the single known entity—the dynamic endpoint—and the dynamic endpoint maintains information and knowledge about the system's business objects, processes, and resources. The dynamic endpoint continues to generate contracts for the other objects in the system even as new objects are added or existing objects are modified.

In one embodiment, previous versions of endpoints are maintained even as new endpoints are generated. This can be useful when a client device chooses or requires using a specific version of a contract or endpoint, even after a new contract or endpoint has been generated.

In one embodiment, the server constructs and publishes contracts for all objects that are maintained or stored on the server. In one embodiment, the server constructs and publishes contracts for only for a subset of the business objects stored on the server by excluding some of the business objects. The subset may be determined based on configuration criteria.

Alternatively, the criteria may be determined at the same time that the server constructs and publishes contracts. This allows a user to exercise granular control over the dynamic nature of the system.

For example, the dynamic endpoint generator may implement a category system. In one embodiment, every object has a unique endpoint. In one embodiment, every business object is placed in a category, and every category has a unique endpoint. When multiple business objects share the same category (and thus the same endpoint), those business objects can be selected or deselected by the dynamic endpoint generator. This allows a user to dynamically update only certain categories of business objects.

For example, a user working on a project may place all business objects relating to that project under one category. The user may only select that category (and thus endpoint) and the dynamic endpoint generator will dynamically update the contracts for the business objects belonging to that category. Other business objects in other categories are excluded by the dynamic endpoint generator, reducing the number of business objects that are dynamically updated and thus reducing memory footprint, regeneration time, and startup time. Users can create subcategories and choose to dynamically generate contracts for objects belonging to certain subcategories. Thus, users can control with precision which business objects are to be dynamically updated.

Figure 16:
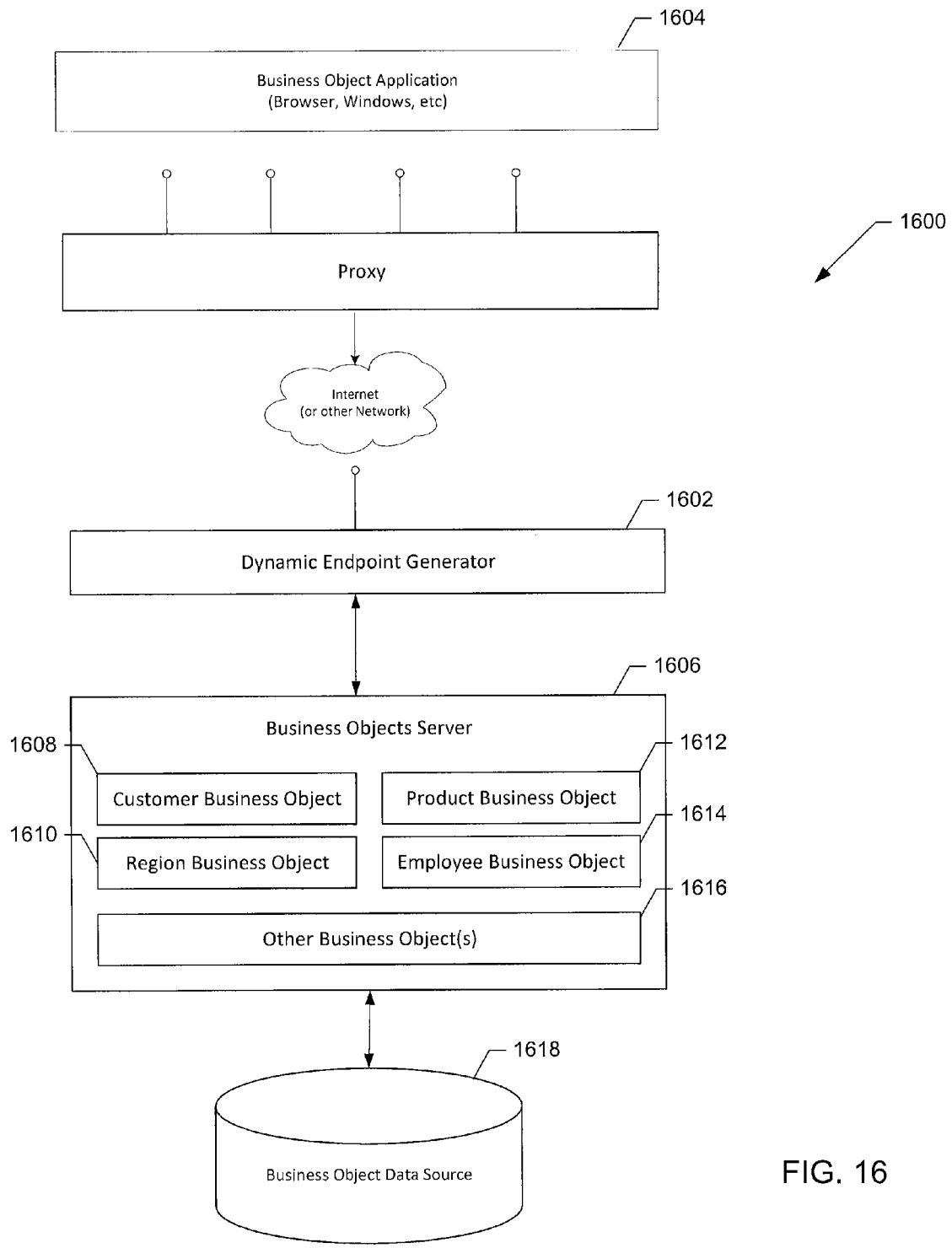
FIG. 16 is a diagram showing one example of a system implementing a dynamic endpoint generator to enable an application to consume business objects.

FIG. 16 is a screenshot of an embodiment of a system 1600 implementing a Dynamic Endpoint Generator 1602 to enable a Business Object Application 1604 to consume business objects. Various business objects are stored on a Business Objects Server 1606. For example, the Business Objects Server 1606 contains a Customer Business Object 1608, a Region Business Object 1610, a Product Business Object 1612, an Employee Business Object 1614, and other Business Objects 1616. The business objects communicate with the Business Object Data Source 1618. In one embodiment, the system generates an endpoint when the business object is created.

In one embodiment, the system has not generated any contracts for any of the business objects, and only generates endpoints when the businesses objects are requested. For example, an organization may need to store the first name, the last name, and the social security number of its customers. A user specifies these fields when defining the Customer Business Object 1608.

The Business Object Application 1604 may need to interact with the Customer Business Object 1608. For example, the Business Object Application 1604 wishes to create a new customer by using the Customer Business Object 1608. However, the Business Object Application 1604 does not have the endpoint information for the Customer Business Object 1608. When the Business Object Application 1604 requests a communication with or desires to consume the Customer Business Object 1608, it sends a request to the Dynamic Endpoint Generator 1602. The Dynamic Endpoint Generator 1602 automatically constructs and publishes endpoint information, including a data contract, for the Customer Business Object 1608. Thus, the Business Object Application 1604 can now consume the Customer Business Object 1608 even though the Customer Business Object 1608 did not previously have an endpoint. In one embodiment, the Dynamic Endpoint Generator 1602 generates an endpoint when a business object is created.

In one embodiment, after the Business Object Application 1604 consumes the Customer Business Object 1608, the definition of the Customer Business Object 1608 is modified. For example, the organization may now require storing the address of its customers in addition to the first name, the last name, and the social security number of its customers. The address information may be retrieved from a different database than the databases holding the first name, last name and social security number. A user modifies the definition of the Customer Business Object 1608. When the Customer Business Object 1608 is updated, the new property of the Customer Business Object 1608 is republished and the Dynamic Endpoint Generator 1602 is automatically notified of the modification to the Customer Business Object 1608. The Dynamic Endpoint Generator 1602 updates its own information and publishes an updated endpoint for the Customer Business Object 1608. Thus, the Business Object Application 1604 always has the most current endpoint information for the Customer Business Object 1608.

In one embodiment, the business objects are exposed to a client device through a web infrastructure such as Windows Communication Foundation (WCF), which is part of the .NET framework. The client device may use standard WCF mechanisms. In one example, the contract or endpoint is generated in declarative format. The declarative format may be XML. In one embodiment, the contracts are published in the form of standard Web Service Definition Language (WSDL) models. Or, the endpoints or contracts may be published using representational state transfer (REST), such as, for example, implementing XML, the Atom Syndication Format and/or Publishing Protocol (Atom), or JavaScript Object Notation (JSON). The endpoints can include Secure Sockets Layer (SSL) or Transport Layer Security (TSL) support.

Figure 17:
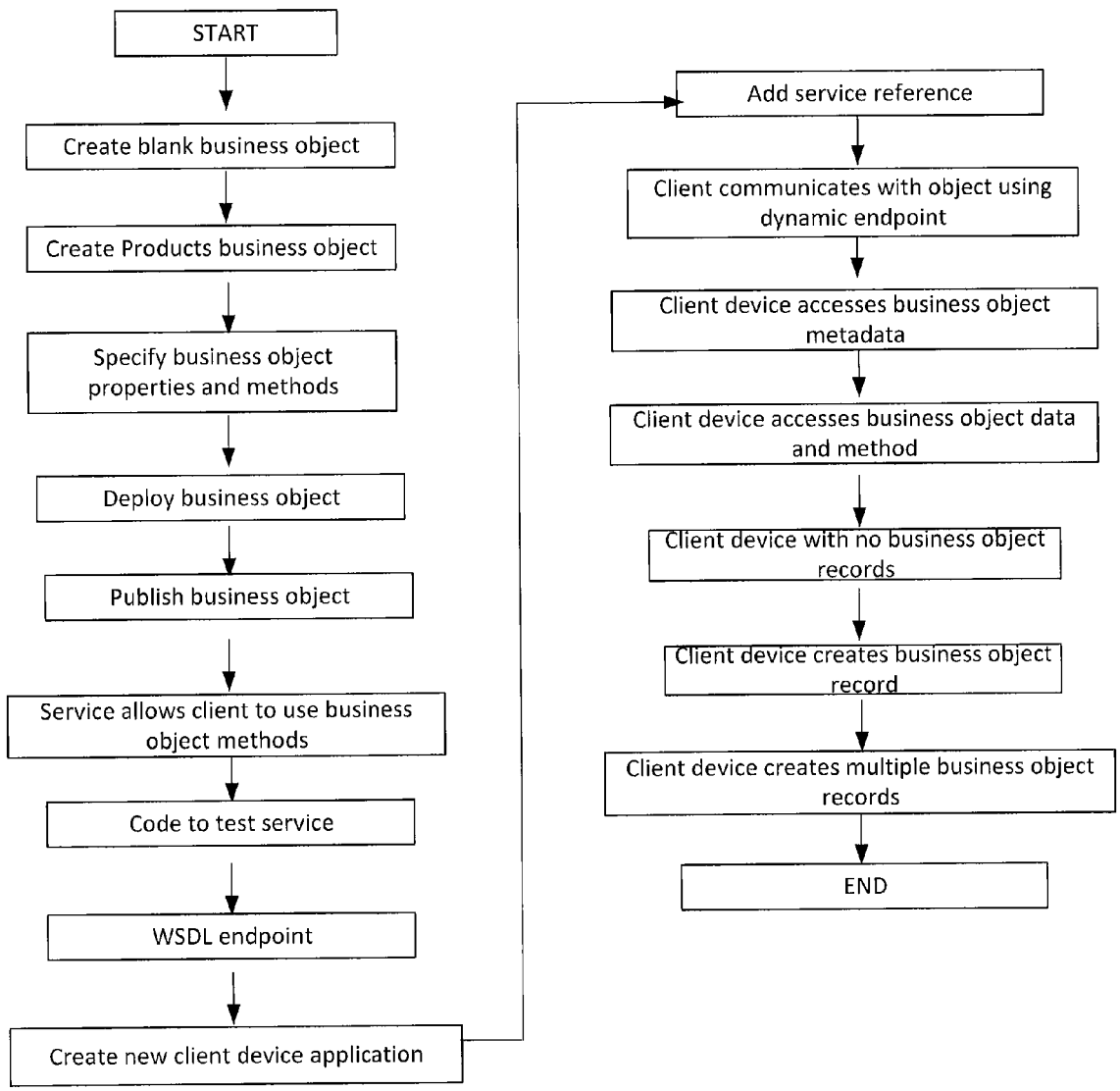
FIG. 17 is a flowchart illustrating one example process of generating, deploying and publishing a business object, automatically generating a dynamic endpoint for the business object, and allowing a client device to consume the business object utilizing the dynamic endpoint.

FIG. 17 is a flowchart illustrating one example process 1700 of generating, deploying and publishing a business object, automatically generating a dynamic endpoint for the business object, and allowing a client device to consume the business object utilizing the dynamic endpoint. Preferably, the process 1700 is embodied in one or more software programs which is stored in one or more memories and executed by one or more processors. For example, the process 1700 may be JavaScript code (or any other type of software) running on a client device 102. Although the process 1700 is described with reference to the flowchart illustrated in FIG. 17, it will be appreciated that many other methods of performing the acts associated with process 1700 may be used. For example, the order of many of the steps may be changed, and some of the steps described may be optional. Also, some of the steps may be combined to form one step.

Generally, a new business object is created, the dynamic endpoint generator automatically generates endpoint information for the business object, and a client device can consume the business object without the need to manually generate a contract or other endpoint information, such as a contract, for the business object.

More specifically, a design tool may be used to create a new Products business object, and the business object is then deployed and published on a server 192.168.1.38:7. A dynamic endpoint "http://dlx.denallix.com:8000/Demo" for the business object is generated. A remote client device ProductsSvcClient can communicate with the endpoint so that the endpoint provides binding information, metadata, data and method contracts to the client device. The client device can use methods such as ProductsSvc_Create, ProductsSvc_Save, ProductsSvc_Delete, ProductsSvc_Load, and ProductsSvc_GetList that may be associated with the Products business object. The client device ProductsSvcClient consumes the Products business object, and using one or all of the methods, creates product records ACME Widgets and ACME Gadgets.

Figure 18:
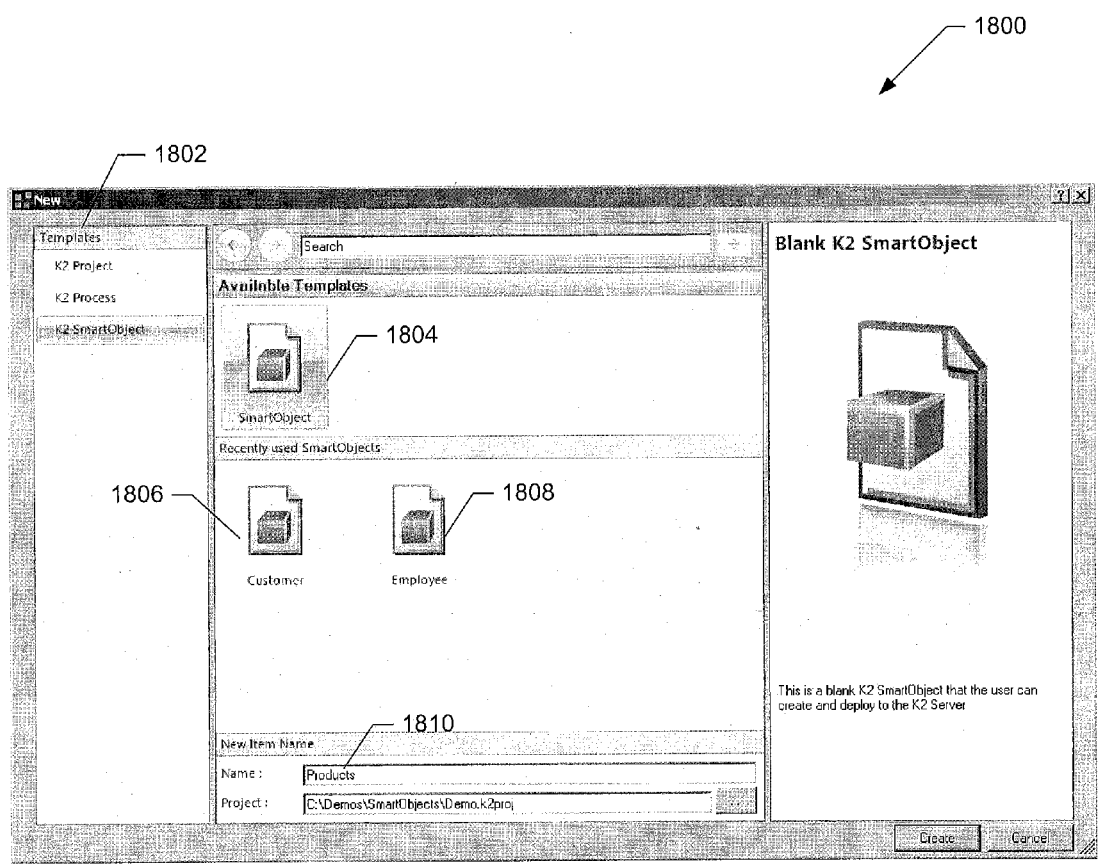
FIG. 18 is a screenshot of an example design tool that allows a user to create a blank business object.

As shown in FIG. 18, the user can use a design tool 1800 to create a new business object. The tool includes templates 1802 to create projects, processes or business objects. If the user wants to create a new blank business object, the user selects the business object template 1804. Or, the user can access and reuse other recently used business objects such as Customer 1806 and Employee 1808. Then, the user hits the Create button to create the new business object named Products 1810.

Figure 19:
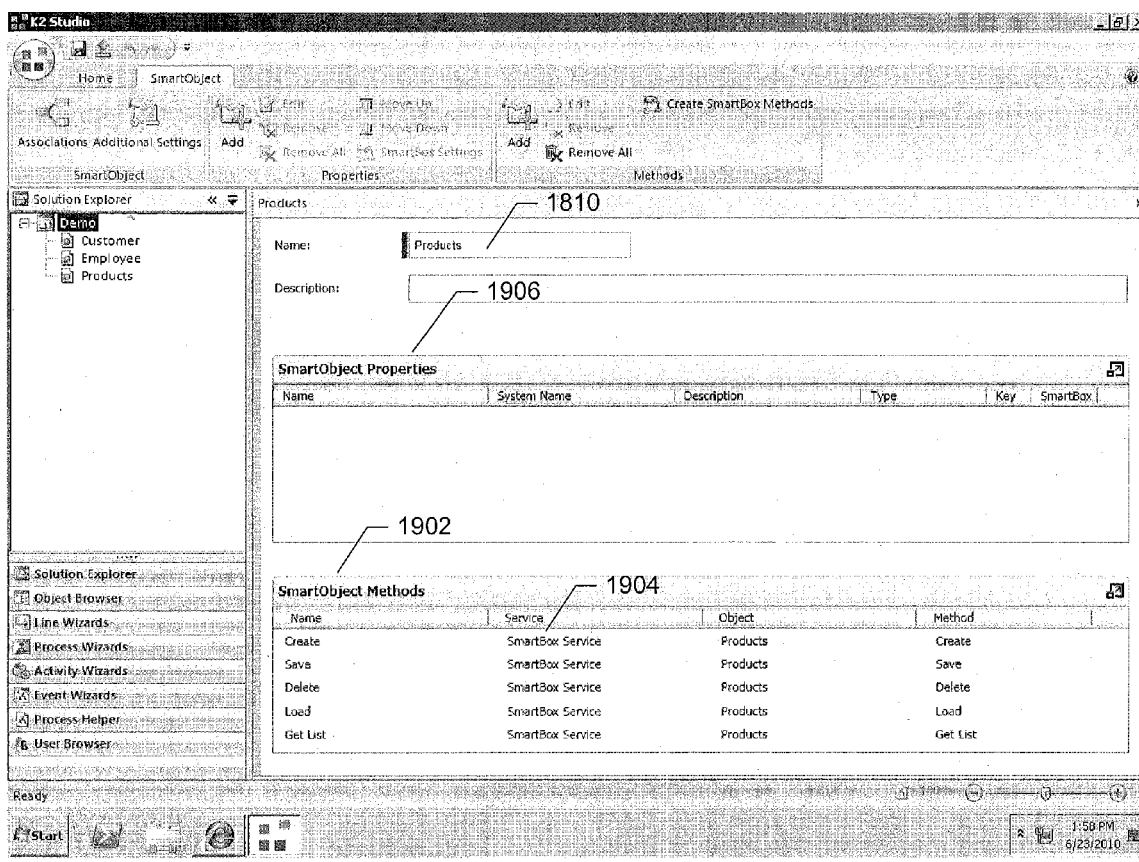
FIG. 19 is a screenshot of an example Products business object.

Each business object is typically associated with properties and methods. FIG. 19 illustrates that in one example the Products business object 1810 has five default methods 1902 that the user may call when using the Products business object 1810. The methods are part of a SmartBox service 1904 that is available to the user. Other services may also be available to the user, and user may use and combine services from multiple sources. The new Products business object 1810 does not have any properties 1906 associated with it yet.

Figure 20:
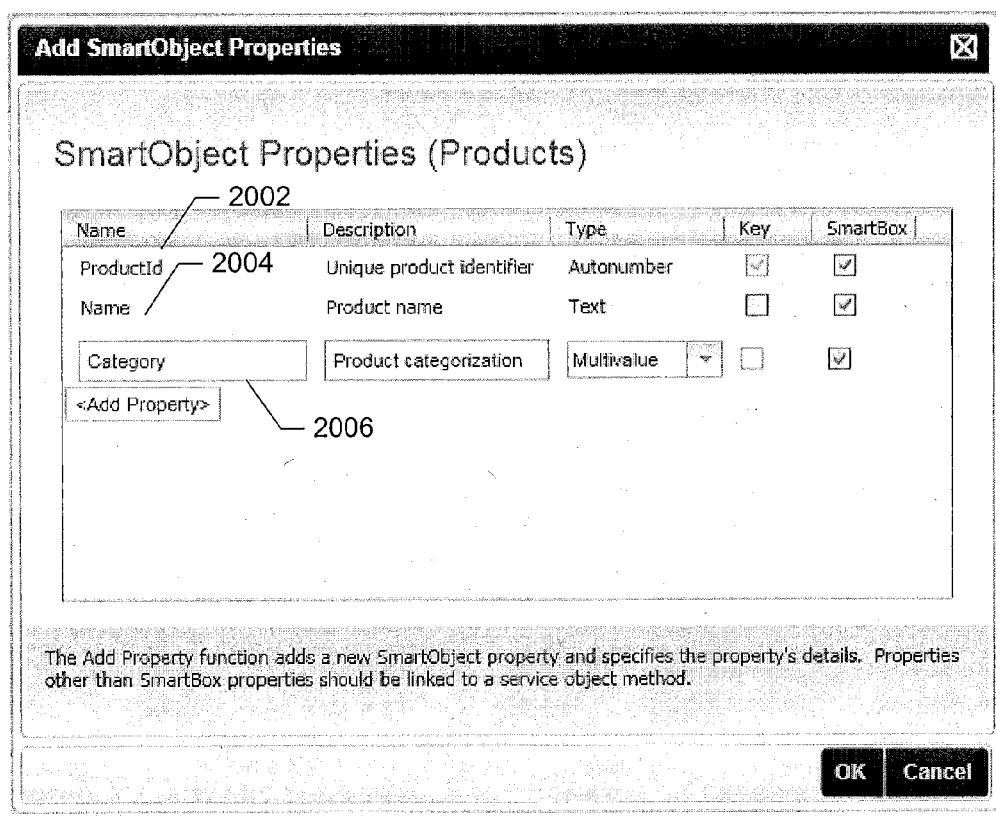
FIG. 20 is a screenshot of an example of business object properties.
Figure 21:
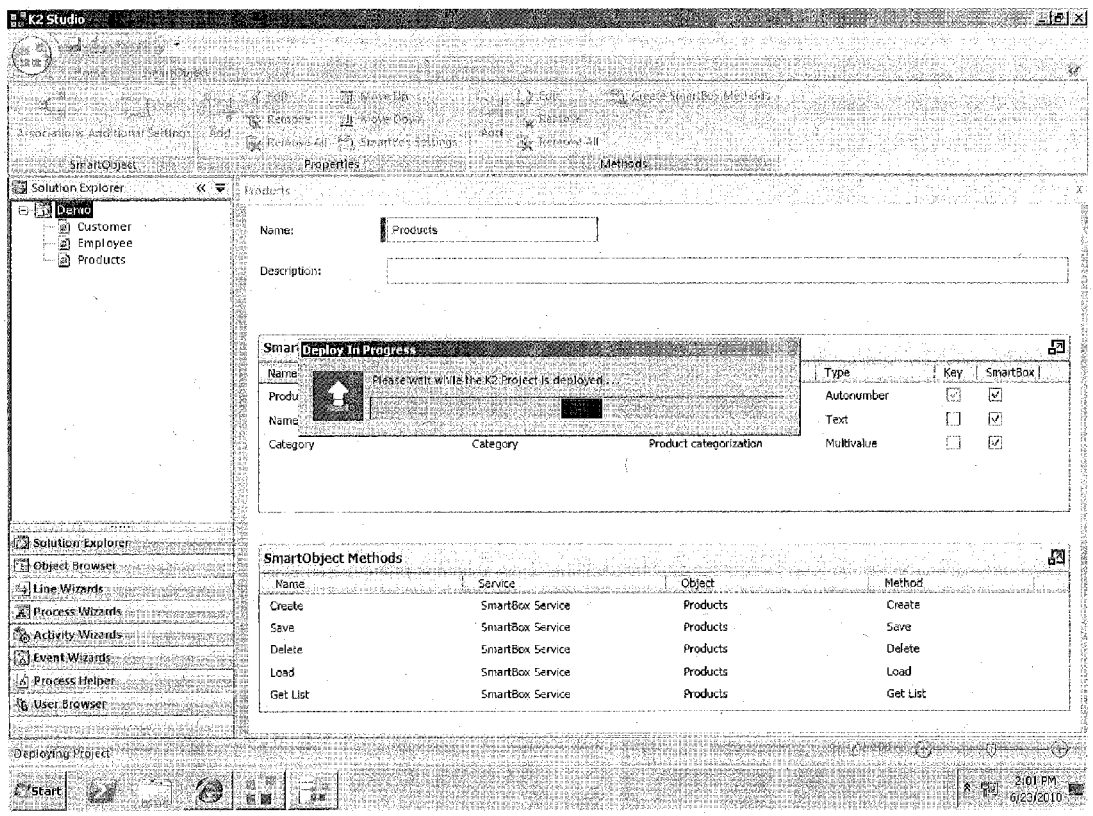
FIG. 21 is a screenshot of an example of deploying a business object.

The user can add properties that define the business object. FIG. 20 illustrates that the Product Business object 1810 is defined by the ProductID 2002, Name 2004, and Category 2006 properties. Other properties may also be available to the user, and user may use and combine properties from multiple sources. The ProductID 2002 is listed as the key property because the ProductID value is unique for every Product. Once the Products business object's methods 1902 and properties 1906 are defined, the business object 1810 can be deployed to a server as shown in FIG. 21.

Figure 22:
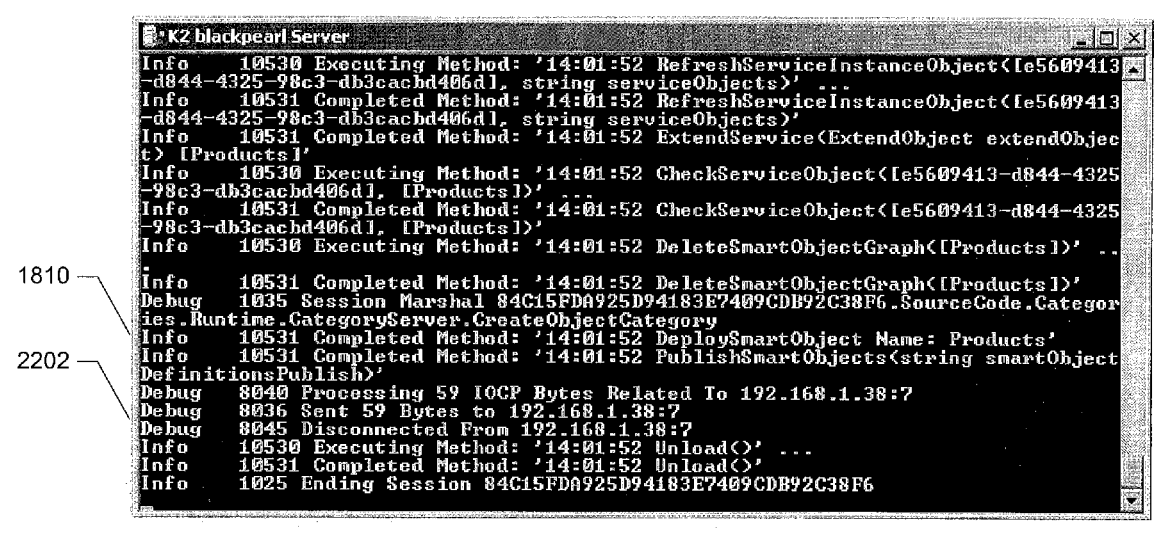

Once a business object is deployed, it must be published. Publishing a business object makes the business object discoverable to clients that may wish to use the business object. FIG. 22 is a screenshot of an example of publishing the Products business object 1810 on the 192.168.1.38:7 server 2202. Once the business object is available on the server, a dynamic endpoint is automatically generated so that the business object can be consumed by a client.

In one embodiment, the user may have the option of configuring various settings related to an endpoint, such as, for example, whether an endpoint is enabled for a business object, whether the business object is excluded from having endpoints, whether isolation is used for the endpoint, and whether custom bindings are used for the endpoint.

Figure 23:
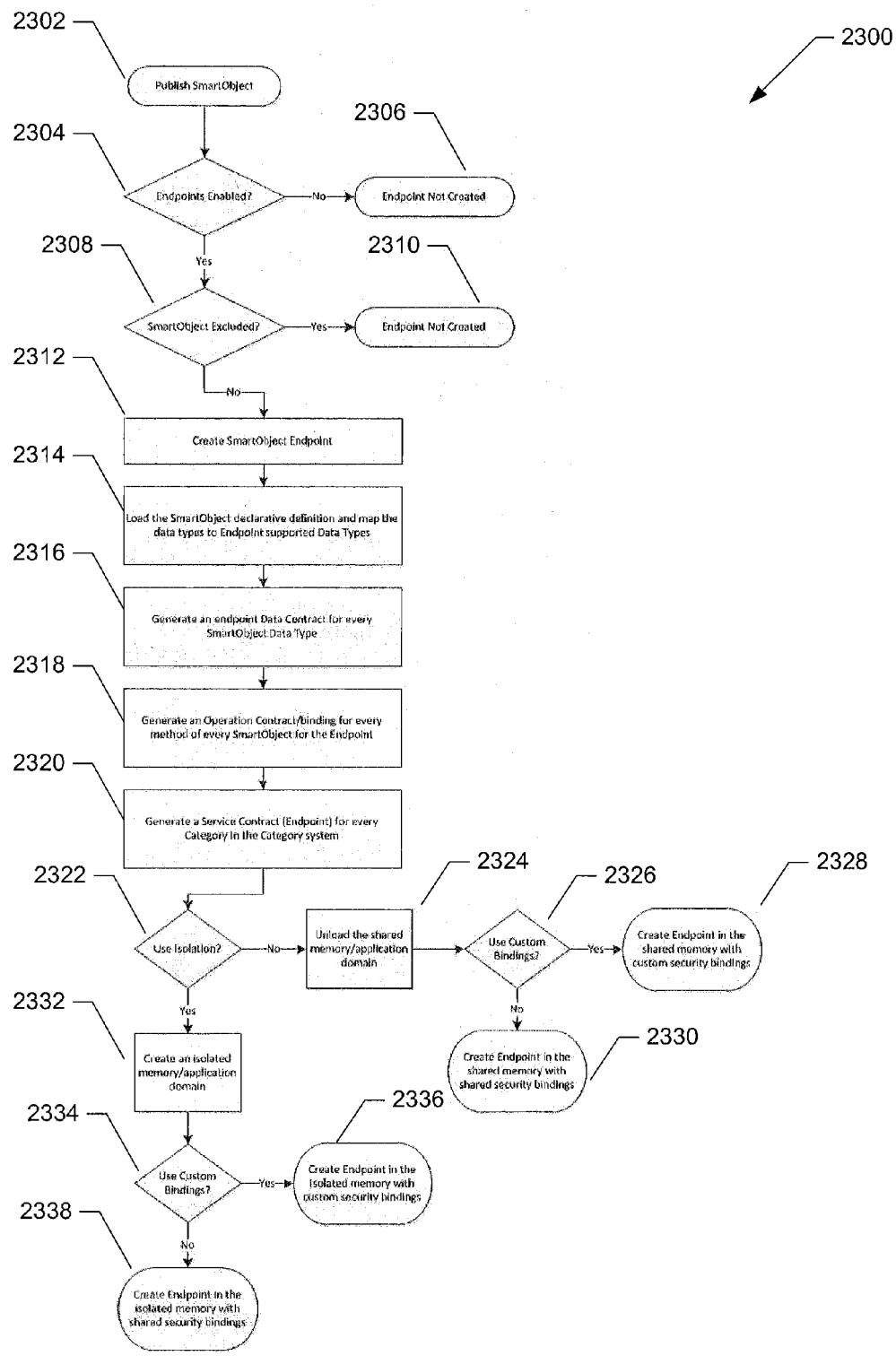
FIG. 23 is a flowchart illustrating one example of configuring endpoints for a business object.

FIG. 23 illustrates an example flowchart 2300 of configuring endpoint information for a business object in response to a business object being created and published. A SmartObject business object is published at step 2302. Then, the dynamic endpoint generator checks whether endpoints are enabled in the configuration criteria in step 2304. If endpoints are not enabled, an endpoint is not created as shown in step 2306. If endpoints are enabled, the dynamic endpoint generator checks whether the business object has been excluded from being part of a server refresh or from having endpoints being created, as shown in step 2308. if the business object is excluded, an endpoint is not created as shown in step 2310. If the business object is not excluded, the dynamic endpoint generator proceeds to create an endpoint for the business object in step 2312.

To generate an endpoint, the dynamic endpoint generator, in one embodiment, loads the definition of the business object and maps the data types to endpoint supported data types in step 2314. In step 2316, the dynamic endpoint generator generates data contracts for every business object data type. In step 2318, the dynamic endpoint generator generates operation contracts and/or bindings for every business object method. In step 2320, the dynamic endpoint generator generates a service contract for every category in the category system. For example, the dynamic endpoint generator generates endpoints not only for the business object published at step 2302, but all business objects belonging to the same category as the business object or all categories recognized by the dynamic endpoint generator.

In step 2322, a user can configure whether isolation should be used for the endpoint. If isolation is not to be used, then the shared memory/application domain is unloaded in step 2324. A user can configure whether custom bindings should be used in step 2326. If custom bindings should be used, then an endpoint is created in shared memory with custom security bindings in step 2328. If custom bindings should not be used, then an endpoint is created in shared memory with shared security bindings in step 2330.

If isolation is to be used in step 2322, then an isolated memory/application domain is created in step 2332. In step 2338, a user can configure whether custom bindings should be used. If custom bindings should be used, then an endpoint is created in isolated memory with custom security bindings in step 2336. If custom bindings should not be used, then an endpoint is created in isolated memory with shared security bindings in step 2338.

The configuration criteria may be predetermined or they may be specified when the endpoint is created. Configuration may be performed at various different levels. For example, a user may be able to configure at the services level, at a WCF/REST protocol level, or at a managed level. Using these three levels of configuration, a user can granularly control exactly where and how an endpoint is generated.

Services configuration controls the default functionality of services, including whether services are enabled to run or not, or whether the endpoint generator will listen for certain events, such as, for example, the creation of a new business object. WCF/REST configuration allows a user to override the default services capability and specify an endpoint address per endpoint type, e.g., WCF or REST.

Table 1 provides an example of exemplary code for a default configuration with endpoints enabled.

TABLE 1

```
<smoServices enableEndpoints="true" enableEvents="true"
enableCrossDomainPolicy="true" enableMetadata="true" scheme="http"
server="api.denallix.com" port="8888"
serviceRoot="SmartObjectServices" specialCharacterReplacement="_"
defaultSecurityLabel="K2" individualSmartObjects="true">
    <wcf binding="wsHttpBinding"
    bindingConfiguration="wsHttpBinding+Windows" />
    <rest binding="webHttpBinding"
    bindingConfiguration="webHttpBinding+Windows" />
    <managedEndpoints>
        <excluded all="false" />
    </managedEndpoints>
</smoServices>
<system.serviceModel>
    <bindings>
        <basicHttpBinding>0
            <binding name="basicHttpBinding+Windows+HTTPS">
                <security mode="Transport">
                    <transport clientCredentialType="Windows" />
                </security>
            </binding>
            <binding name="basicHttpBinding+Basic+HTTPS">
                <security mode="Transport">
                    <transport clientCredentialType="Basic" />
                </security>
            </binding>
            <binding name="basicHttpBinding+Windows">
                <security mode="TransportCredentialOnly">
                    <transport clientCredentialType="Windows" />
                </security>
            </binding>
            <binding name="basicHttpBinding+Basic">
                <security mode="TransportCredentialOnly">
                    <transport clientCredentialType="Basic" />
                </security>
            </binding>
        </basicHttpBinding>
        <wsHttpBinding>
            <binding name="wsHttpBinding+Windows">
                <security mode="Message" />
            </binding>
            <binding name="wsHttpBinding+TWMC+HTTPS">
                <security mode="TransportWithMessageCredential">
                    <message clientCredentialType="Windows" />
                </security>
            </binding>
```

TABLE 1-continued

```
            <binding name="wsHttpBinding+HTTPS">
                <security mode="Transport">
                    <transport clientCredentialType="Windows" />
                </security>
            </binding>
        </wsHttpBinding>
        <webHttpBinding>
            <binding name="webHttpBinding+Basic">
                <security mode="TransportCredentialOnly">
                    <transport clientCredentialType="Basic" />
                </security>
            </binding>
            <binding name="webHttpBinding+Windows">
                <security mode="TransportCredentialOnly">
                    <transport clientCredentialType="Windows" />
                </security>
            </binding>
            <binding name="webHttpBinding+Basic+HTTPS">
                <security mode="Transport">
                    <transport clientCredentialType="Basic" />
                </security>
            </binding>
            <binding name="webHttpBinding+Windows+HTTPS">
                <security mode="Transport">
                    <transport clientCredentialType="Windows" />
                </security>
            </binding>
        </webHttpBinding>
    </bindings>
</system.serviceModel>
```

Managed endpoint configuration allows a user to not only specify a static endpoint for a specific business object or a category of business objects, but to also generate an isolated endpoint with its own address. Without the managed endpoint configuration, all generated endpoints would be stored at a single address, e.g., http://dlx.denallix.com:8000/Demo, and the location of each business object would be appended to that address. With managed endpoint configuration, a user can specify addresses for certain endpoints, allowing such endpoints to be isolated.

An endpoint may be isolated in at least three ways: when it is stored in a different memory space from other endpoints, when it is located at a different Uniform Resource Identifier (URI) than other endpoints, and when the security bindings are different at the WCF/REST protocol level.

Isolating endpoints in a different memory space allows implementing a security boundary around critical endpoints, and also allows isolated endpoints to be individually refreshed, or excluded from being refreshed when other endpoints are being refreshed. Isolating endpoints from being refreshed may be useful when the associated object is being frequently modified. Or, a user may only want to refresh a specific endpoint, as may be the case when associated objects are being developed or implemented. In one embodiment, only one endpoint is isolated for dynamic generation.

A second type of isolation made possible by managed endpoint configuration is URI isolation, which allows access of an endpoint to be isolated. For example, a user may be able to host all public endpoints at a common URI, but be able to host certain private endpoints at a different URI. To access these private endpoints, a client device must know the specific URI. Thus, the discovery and access of endpoints can be isolated.

A third type of isolation made possible by managed endpoint configuration is security binding isolation, which allows access of an endpoint to be isolated based on the binding configuration. For example, a user may be able to host all public WCF and REST endpoints using a common security binding for WCF and REST protocols, but be able to host certain private endpoints using a unique security binding configuration for WCF or REST protocols.

In one embodiment, the various levels of configuration settings allow for inheritance of configuration parameters. In one embodiment, services configuration overrides default settings, WCF/REST configuration overrides services configuration settings (so that a user can configure all the endpoints that match WCF/REST-type endpoints), and managed endpoint configuration overrides WCF/REST configuration settings (so that a user can configure individual business objects or categories of business objects). Each subsequent level of configuration—going from service configuration to WCF/REST configuration to managed endpoint configuration—applies stronger logic that increases conditions on the endpoints as they are being generated.

Table 2 provides an example of exemplary pseudo-code for setting configuration options in one embodiment.

TABLE 2

```
Services
        enableEndpoints (Boolean) - determine if the K2 SmartObject Services service will be
        started
                True - start K2 SmartObject Services and load the configured endpoints
                False (default/omitted) - do not start K2 SmartObject Services or load any
                endpoints
        enableEvents (Boolean) - determines if changes to SmartObjects will be reflected
        dynamically without restarting K2 Server
                True (default/omitted) - when SmartObjects are created/changed/deleted the
                service will dynamically reload the AppDomain containing the affected
                SmartObjects
                False - when SmartObjects are created/updated/deleted the service will not
                reflect the changes without restarting K2 Server
        enableCrossDomainPolicy (Boolean) - determines if the service endpoints will have cross
        domain support
                True - enable cross-domain support allowing browser-based applications, such
                as Silverlight, to make calls to the service endpoint from a different domain
                        Files - the files that control the level of cross-domain support are
                        crossdomain.xml and clientaccesspolicy.xml. These files can be found
                        and edited in the [Installation Directory]\Host Server\Bin\SmOServices
                        directory.
                        NOTE: the server value must be a DNS name or fully qualified machine
                        name for cross-domain support to work properly.
                False (default/omitted) - disable cross-domain support disallowing browser-based
                applications, such as Silverlight, to make calls to the service endpoint from a
                different domain
        enableMetadata (Boolean) - determine if a Service Metadata Document (aka, WSDL) will
        be generated for the endpoint via ?wsdl
                True (default/omitted) - a Service Metadata Document will be created for the
                endpoint
                False - a Service Metadata Document will not be created for the endpoint
        scheme (String, required) - the default scheme (http or https if SSL is enabled) for the
        endpoints.
                Default: http
        server (String, required) - the DNS or fully qualified domain name of the server hosting
        the endpoints
                Default: {Fully Qualified Machine Name}
        port (String) - the default port for the endpoints
                Default: 8888
                Omitted: 80
        serviceRoot (String) - the default service root for the endpoints
                Default: SmartObjectServices
        specialCharacterReplacement (String) - allows administrators to control what character is
        used in place of disallowed generated characters such as spaces
                Default/Omitted: _
        defaultSecurityLabel (String) - sets the default security label to prepend to the user name
        for basic authentication methods
                Default: K2
                Omitted: no security label will be prepended, the user name must contain the label
                as well
WCF
The <wcf> section contains the default binding configuration for the
WCF endpoints and optional WCF specific Service URI components.
        binding (String, required) - sets the default binding type for the WCF endpoint
                Support for basicHttpBinding, wsHttpBinding
                Default: wsHttpBinding
        bindingConfiguration (String, required) - sets the configuration in the
        <system.serviceModel> section which contains the binding details for the endpoint
                Default: wsHttpBinding+Windows
        bindingConfiguration (String, required) - sets the configuration in the
        <system.serviceModel> section which contains the binding details for the endpoint
        scheme (String) - if present, overrides the default scheme and requires server
        server (String) - if present, overrides the default server and requires scheme
        port (String) - if present, overrides the default port
        serviceRoot (String) - if present, overrides the default service root
        defaultSecurityLabel (String) - if present, overrides the default security label
        individualSmartObjects (Boolean) - if present, will generate an endpoint for each
        individual SmartObject in addition to the endpoint at the category level
```

TABLE 2-continued

Default: false

REST

The <rest> section contains the default binding configuration for the REST endpoints and optional REST specific Service URI components.
- binding (String, required) - sets the default binding type for the REST endpoint
  - Support for webHttpBinding
  - Default: webHttpBinding
- bindingConfiguration (String, required) - sets the configuration in the <system.serviceModel> section which contains the binding details for the endpoint
  - Default: webHttpBinding+Windows
- scheme (String) - if present, overrides the default scheme and requires server
- server (String) - if present, overrides the default server and requires scheme
- port (String) - if present, overrides the default port
- serviceRoot (String) - if present, overrides the default service root
- defaultSecurityLabel (String) - if present, overrides the default security label Managed Endpoints The category is the default high-level object that is bound to the endpoint via the URI. For example, if a category and SmartObject exist at the same level, the endpoint will be bound to the category. In addition to the default binding of SmartObjects methods within a category endpoint, SmartObjects can be configured to also have their own endpoints (direct URI navigation to the SmartObject). In the case where a category and a SmartObject end up having the same endpoint, the category will win and be bound to the endpoint and an error will be logged for the collision. Managing the endpoints allows the administrator to control which categories and SmartObjects are available via WCF and REST services. There are two main sections: Excluded and Static.
- Excluded means the category path and the SmartObjects in that category are excluded. Each subcategory is not automatically excluded and will require a separate entry.
- Static means the specific category and, depending on the scenario, a specific SmartObject is included.

Excluded

Configure excluded endpoints to prevent a category or subcategory, and the SmartObject methods in that category/subcategory, from having an endpoint generated.
- all (Boolean, required) - determine if all categories will be excluded
  - True (default) - exclude all categories from endpoint generation. This allows for only static endpoints to be available.
  - False - generate endpoints for all categories not explicitly excluded
- the <endpoints> section contains an <endpoint> for each category path to explicitly exclude
  - categoryPath (String, required) - the path to the category/subcategory
    - Example 1: Exclude the Task Allocation category from endpoint generation. All subcategories would still be included.
    - <endpoint categoryPath="Task Allocation"/>
    - Example 2: Exclude the Workflow Reports/Workflow General subcategory from endpoint generation. The parent category, Workflow Reports, and any subcategories would still be included.
    - <endpoint categoryPath="Workflow Reports/Workflow General"/>
  - excludeSubCategories (Boolean, optional) - the path to the category/subcategory
    - True - exclude the parent category and all subcategories from endpoint generation.
    - False (default) - generate endpoints for all subcategories not explicitly excluded
    - Example 1: Exclude the Task Allocation category and all its subcategories from endpoint generation.
    - <endpoint categoryPath="Task Allocation" excludeSubCategories="true"/>

Static

Configure static endpoints to enable a one-to-one mapping of a SmartObject to an endpoint, aliasing of the SmartObject URI, creation of a custom AppDomain, changing of the default binding type and selection of a specific SmartObject definition version.
- categoryPath (String) (required) - the path to the category/subcategory
  - Example 1: Including all SmartObjects in a category.
  - <endpoint categoryPath="MyCategory/MyProject" />
  - When specified without a specific SmartObject name in the smartobjectName attribute or individualSmartObjects=true, then all SmartObjects in this category path will be generated. Additionally, if a category path specified does not exist, it will still be monitored so that when a SmartObject is deployed to this category path at a later stage then the endpoint will be generated.
- smartobjectName (String, optional) - the name of the specific SmartObject
  - specified - when specified, the SmartObject will get an endpoint generated
  - missing - when not specified, all SmartObjects present in the category path specified will be generated
- alias (String, optional) - the new path to be used for navigating to the endpoint for this SmartObject or Category. NOTE: path search will use the display name while the binding that is generated will still use system name.
  - If there is a collision with an existing Category or SmartObject, then the last one will win. For example, if you configure two static endpoints with exactly the same alias, the second one in the list will overwrite the first and there will only be one endpoint.
  - Example: alias="MySmartObjectAlias" will generate a SmartObject endpoint binding at http://api.denallix.com:8888/SmartObjectServices/MySmartObject
- isolationLevel (String, optional) - used to specify the AppDomain the endpoint should use

TABLE 2-continued shared (default/omitted) - by default all endpoints will utilize a single AppDomain.
Not setting isolationLevel or specifying isolationLevel="shared" has the same
effect which is to utilize the AppDomain of the service.
single - setting the isolationLevel="single" will ensure that the endpoint for this
SmartObject has its own AppDomain allowing for isolation from all other
endpoints. This is useful when the SmartObject is changing often as the reload of
the endpoint will not affect other endpoints
smartobjectVersion (String, optional) - used to specify a specific version of the
SmartObject definition to bind to the endpoint. The latest version of the SmartObject
definition will be bound by default.
Example: 5
The <wcf> or <rest> section, if present, overrides the WCF and/or REST configuration for
the service for this static endpoint.
binding (String) - if present, overrides the default binding type configured for the
WCF or REST service
Support for basicHttpBinding, wsHttpBinding, webHttpBinding
bindingConfiguration (String) - if present, overrides the default binding
configuration for the WCF/REST service
scheme (String) - if present, overrides the default scheme and requires server
server (String) - if present, overrides the default server and requires scheme
port (String) - if present, overrides the default port
serviceRoot (String) - if present, overrides the default service root
defaultSecurityLabel (String) - if present, overrides the default security label
individualSmartObjects (Boolean) - if present, will generate an endpoint for each
individual SmartObject in addition to the endpoint at the category level
Default: false Table 3 illustrates an example of using the endpoint configuration options, where WCF endpoints inherit a default service level configuration, REST endpoints override the default service level configuration, and managed endpoints also override the default service level configuration.

TABLE 3

```
<smoServices enableEndpoints="true" enableEvents="true" enableCrossDomainPolicy="false"
enableMetadata="true" scheme="http" server="api.denallix.com" port="8888"
serviceRoot="SmartObjectServices" specialCharacterReplacement="_"
defaultSecurityLabel="K2">
    <wcf binding="basicHttpBinding+Basic" bindingConfiguration="wsHttpBinding+Basic"
defaultSecurityLabel="K2SQL" />
    <rest binding="webHttpBinding" bindingConfiguration="webHttpBinding+Windows+HTTPS"
scheme="https" server="api.denallix.com" port="8890" serviceRoot="SmartObjectServices" />
    <managedEndpoints>
                <excluded all="false">
                    <endpoints>
                        <endpoint categoryPath="Task Allocation"
excludeSubCategories="true"/>
                        <endpoint categoryPath="Workflow Reports/Workflow General"/>
                    </endpoints>
                </excluded>
        <static>
            <endpoints>
                <endpoint categoryPath="K2 Examples/Employee">
                    <rest binding="webHttpBinding" bindingConfiguration="webHttpBinding+Windows"
scheme="http" server="denallix.denallix.com" port="8889" serviceRoot="SmartObjects"
defaultSecurityLabel="K2SQL"/>
                </endpoint>
            </endpoints>
        </static>
    </managedEndpoints>
</smoServices>
```

In one embodiment, the dynamic endpoint generator automatically generates an endpoint for a business object as soon as the business object is created. The dynamic endpoint generator loads a definition of the business object and iterates through the definition. The business object definition may include properties and methods. The object definition is mapped to each type of endpoint that is supported, such as WCF or REST, properties are mapped to data contracts, and methods are mapped to operation contracts. The methods may have signatures that describe the method. For example, method signatures may define a minimum set of information needed for a method to function properly, such as the input and output data types of a method.

The dynamic endpoint generator ensures that the signatures for the business object methods contain inputs and outputs supported by each type of endpoint. If not, the dynamic endpoint generator creates such signatures for each business object method.

FIGS. 24 to 27 illustrate one example of consuming a dynamic endpoint that has been generated for a business object. In one example, a service needs to be run before any client can use the endpoint. The service is specific to the environment in which the client resides. A client can then call that service and use the methods that are part of the service.

Figure 24:
FIG. 24 is a screenshot of an example of a service allowing clients to use methods associated with a business object.

FIG. 24 illustrates that a service ProductsSvc 2402 at the endpoint "http://dlx.denallix.com:8000/Demo" 2404 will allow clients to use the methods ProductsSvc_Create 2406, ProductsSvc Save_2408, ProductsSvc_Delete 2410, ProductsSvc_Load 2412, and ProductsSvc_GetList 2414 that are associated with the Products business object 1810.

Figure 25:
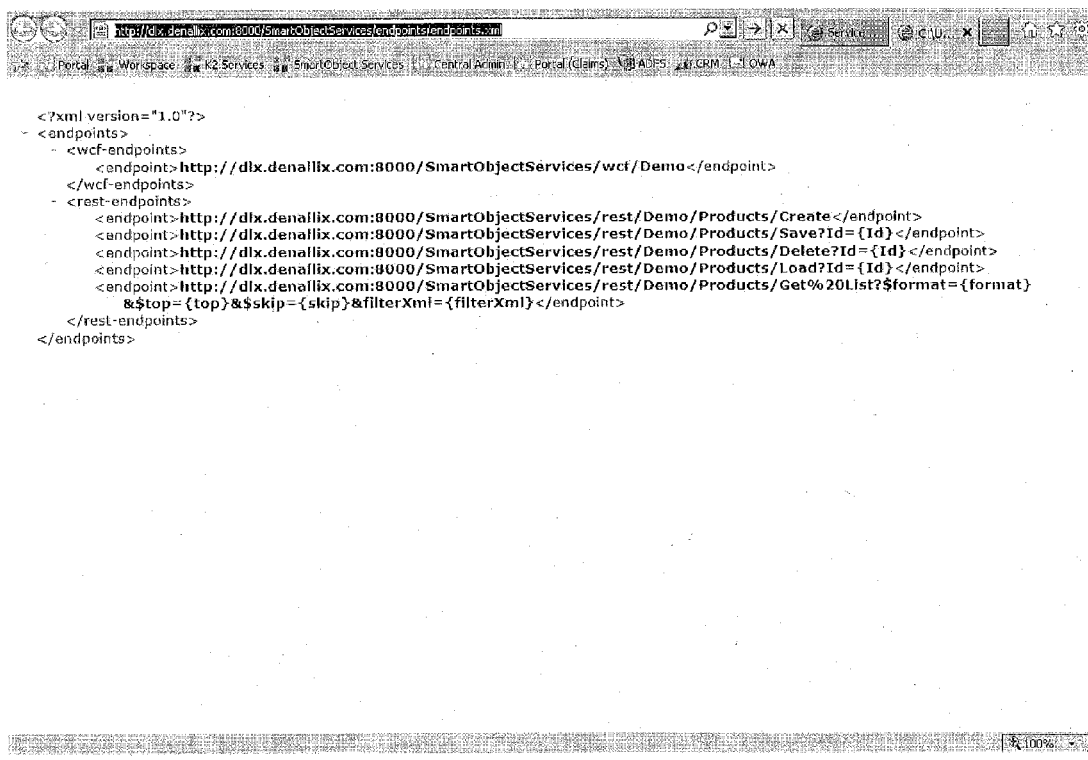
FIG. 25 is a screenshot of an example of WCF and REST endpoints.

FIG. 25 illustrates that the dynamic endpoint generator creates a page 2500 at endpoints.xml that lists all the WCF and REST endpoints that have been generated based on the current configuration. Page 2500 may be updated whenever a new or updated business object is deployed that causes a refresh of the server.

Figure 26:
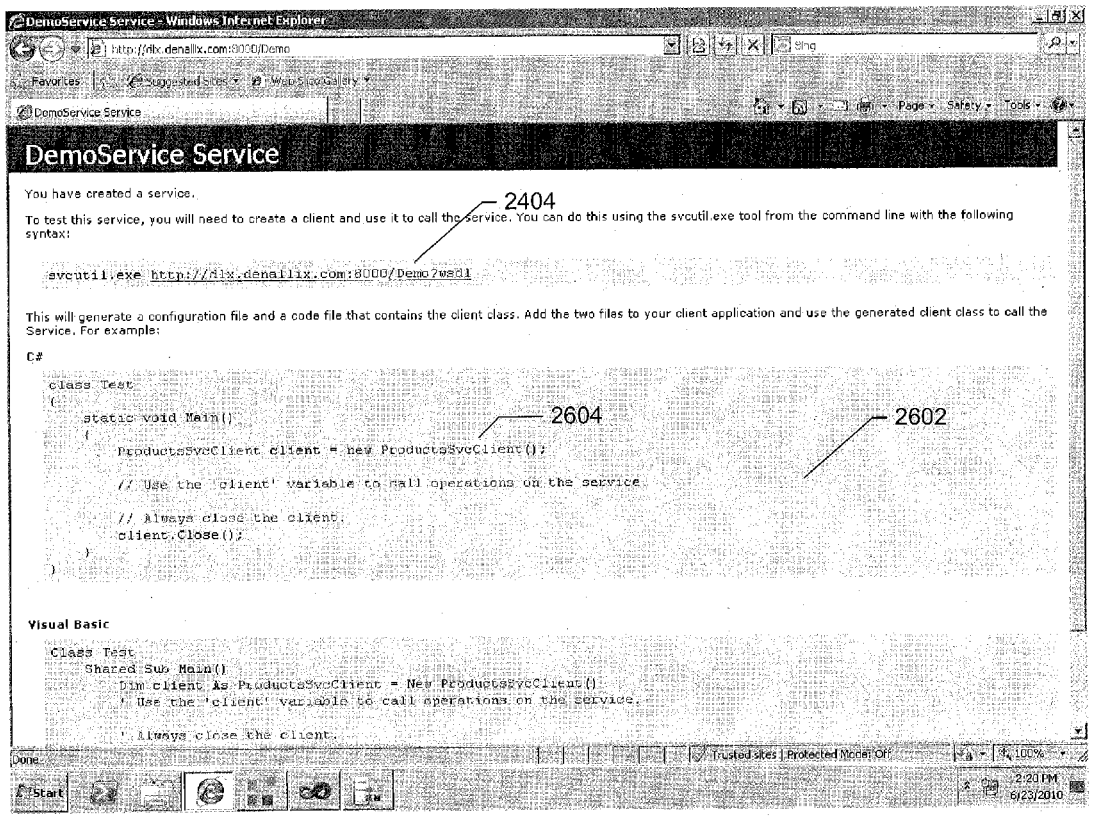
FIG. 26 is a screenshot of an example of code that can be used to test whether a service is working.
Figure 27:
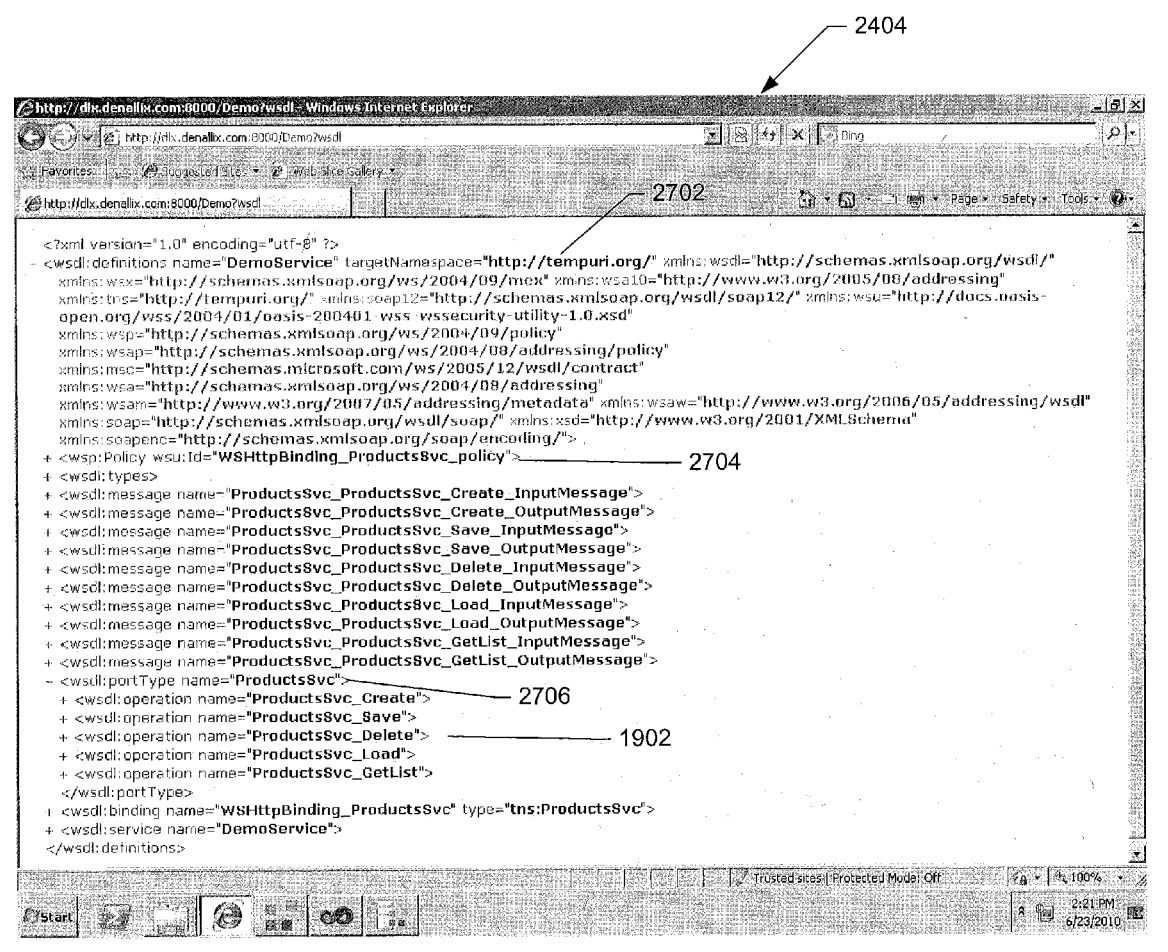

FIG. 26 illustrates an example of code 2602 that can be used to test whether a service is working. A client called ProductsSvcClient 2604 can use the services available at endpoint "http://dlx.denallix.com:8000/Demo" 2404. FIG. 27 illustrates the endpoint 2404 in WSDL that is generated automatically so that clients can use the Products object 1810 and the methods 1902 associated with the Products object 1810. FIG. 27 lists one example of an address 2702, a binding 2704, and a contract 2706 for endpoint 2404 for the Products object 1810. A client can consume the Products business object 1810 without a requirement that the endpoint information be manually generated.

Figure 28:
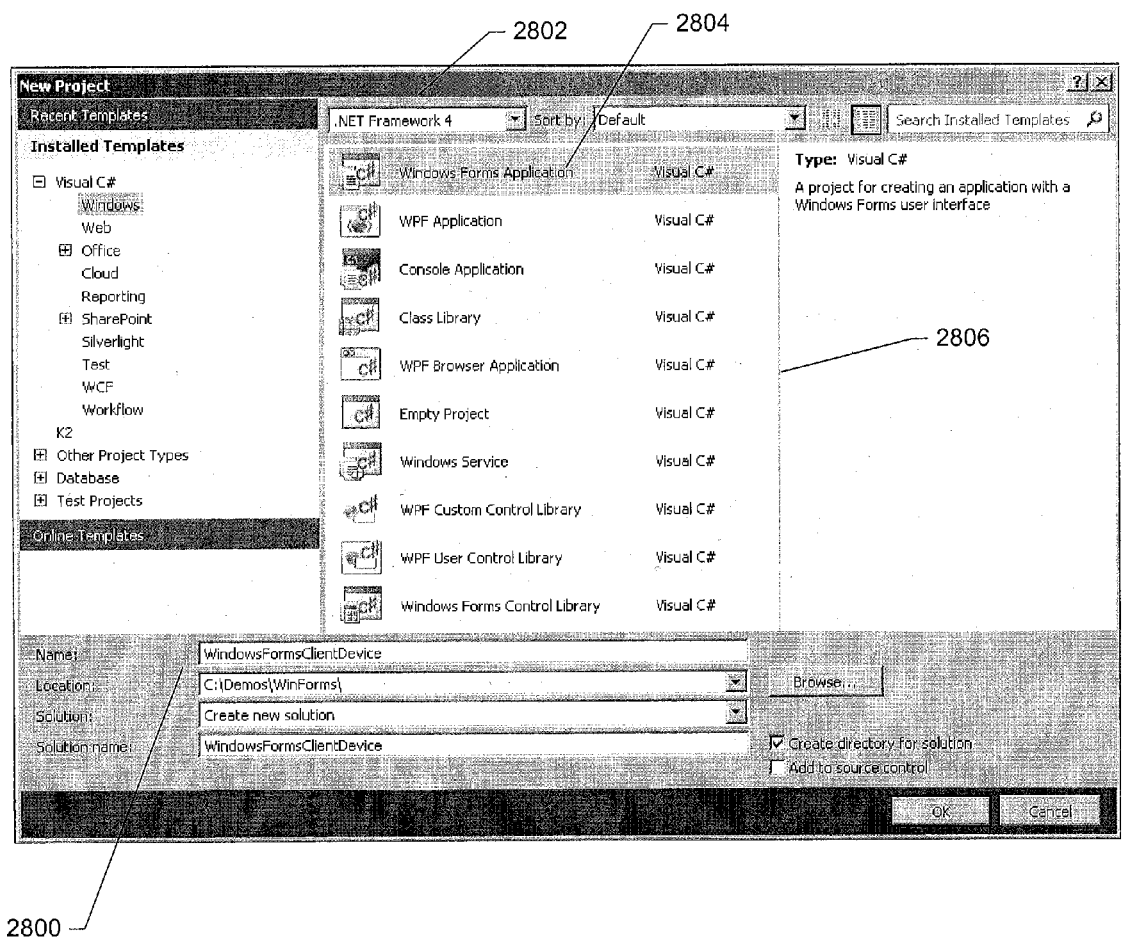
FIG. 28 is a screenshot of an example of creating a new client device application.

FIG. 28 is a screenshot of an example of creating a new client device application 2800. The client can use any interface available in the .NET framework 2802, such as a Windows Forms user interface 2804. Other interfaces 2806 are also available. For example, the client can use any framework that consumes endpoints, such as Java, JavaScript, or HTML 5.

Figure 29:
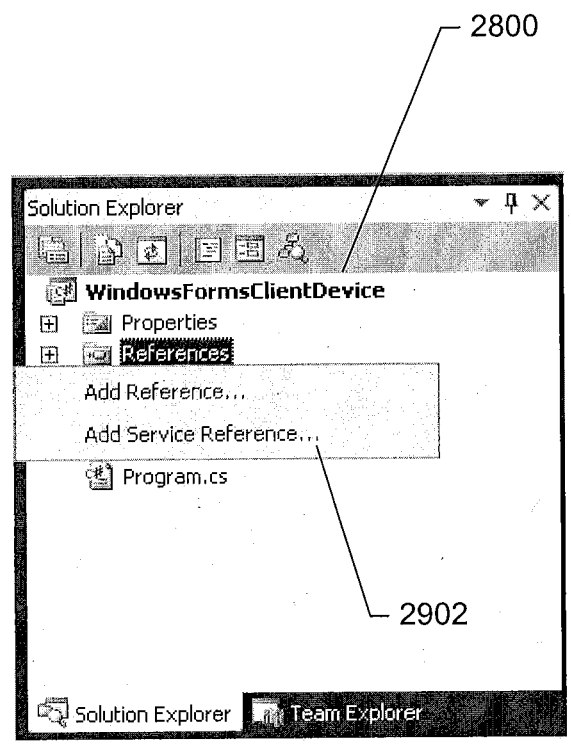
FIG. 29 is a screenshot of an example of adding a service reference.

In one embodiment, the client 2800 subscribes to a service associated with the Products business object 1810 before it can consume the Products business object 1810. FIG. 29 is a screenshot of an example of the client 2800 adding a service reference 2902.

Figure 30:
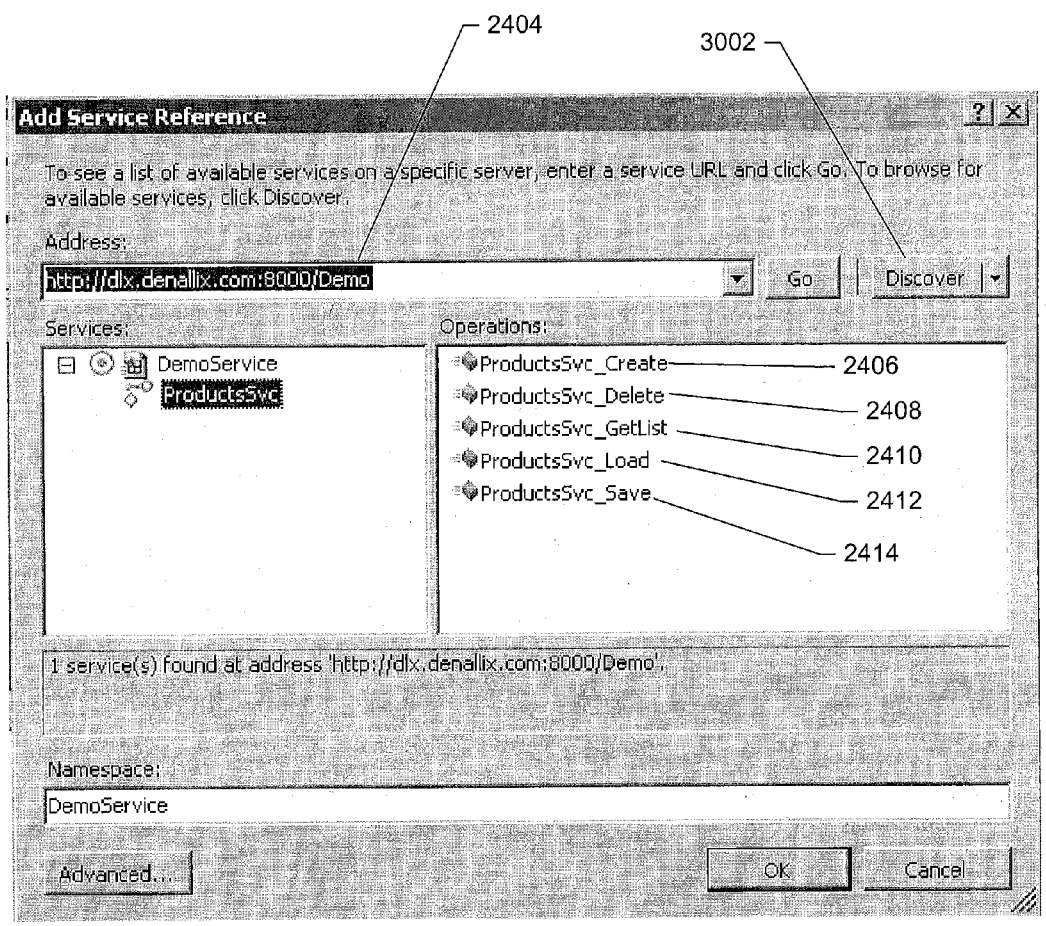
FIG. 30 is a screenshot of an example of a client communicating with a business object using a dynamic endpoint.

FIG. 30 is a screenshot of an example of the client 2800 communicating with a business object 1810 using a dynamic endpoint 2404. Specifically, the client 2800 can access the operations 2406, 2408, 2410, 2412, and 2414 associated with the Products object 1810. In one embodiment, a client 2800 may attempt to discover a business object using a Discover feature 3002. The business object does not yet have an endpoint or a contract that can be used by the client. In one embodiment, after the client attempts to remotely discover a business object, the server constructs and publishes contracts for the business object requested by the client.

In FIG. 30, once the client 2800 adds the service ProductsSvc 2402 at endpoint "http://dlx.denallix.com:8000/Demo" 2404, the client 2800 can use all the operations ProductsSvc_Create 2406, ProductsSvc_Save 2408, ProductsSvc_Delete 2410, ProductsSvc_Load 2412, and ProductsSvc_GetList 2414 that are associated with the Products business object 1810.

Figure 31:
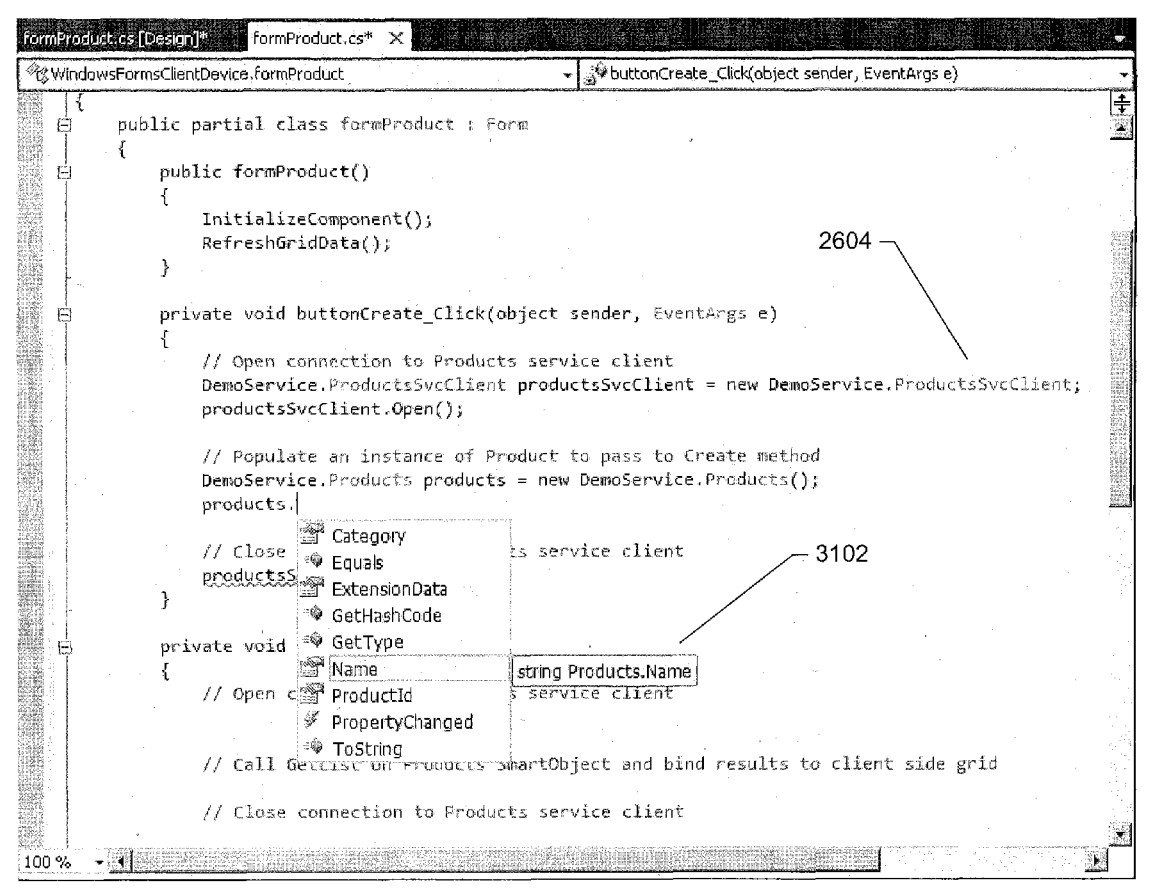

FIG. 31 is a screenshot of an example of business object metadata provided to a client device. In the example, the client ProductsSvcClient 2604 is able to access Product business object metadata 3102—specifically, that the Name field is a string type in the format Products.Name.

FIG. 32 is a screenshot of an example of business object data and method provided to a client device. In the example, the client ProductsSvcClient 2604 is able to use Product business object data 3202 and Product business object methods 1902.

Figure 33:
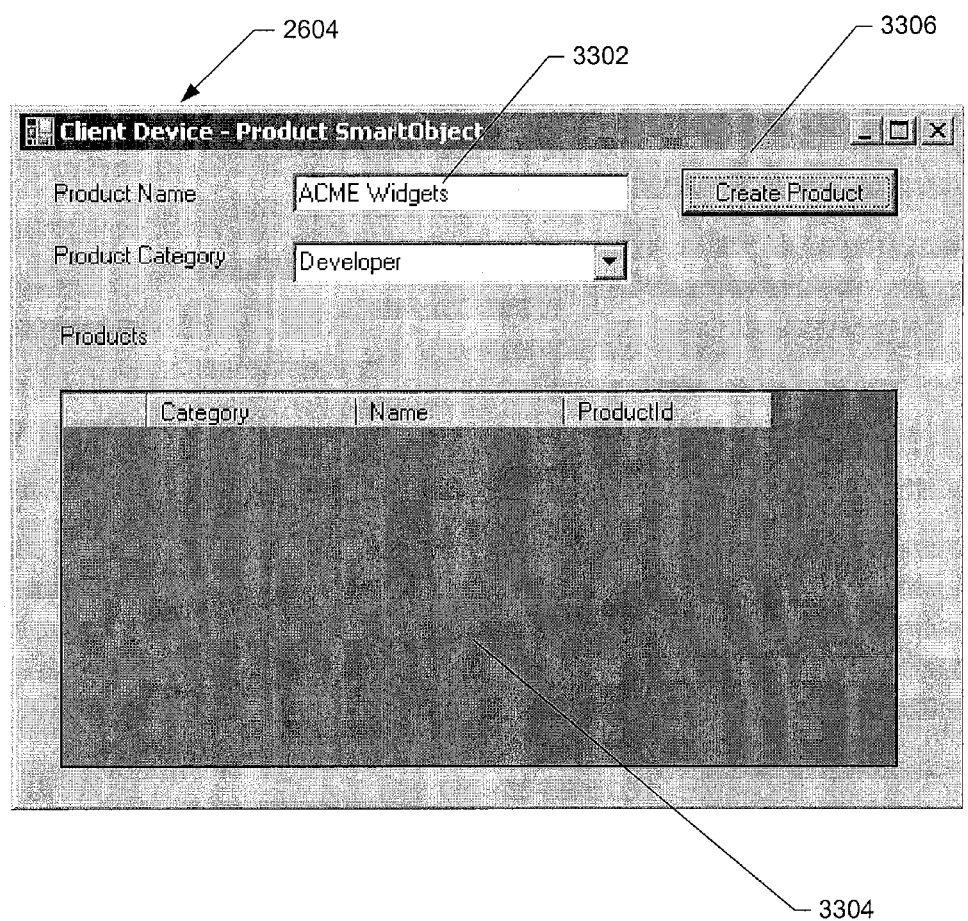
FIG. 33 is a screenshot of an example of a client device with no object records.
Figure 34:
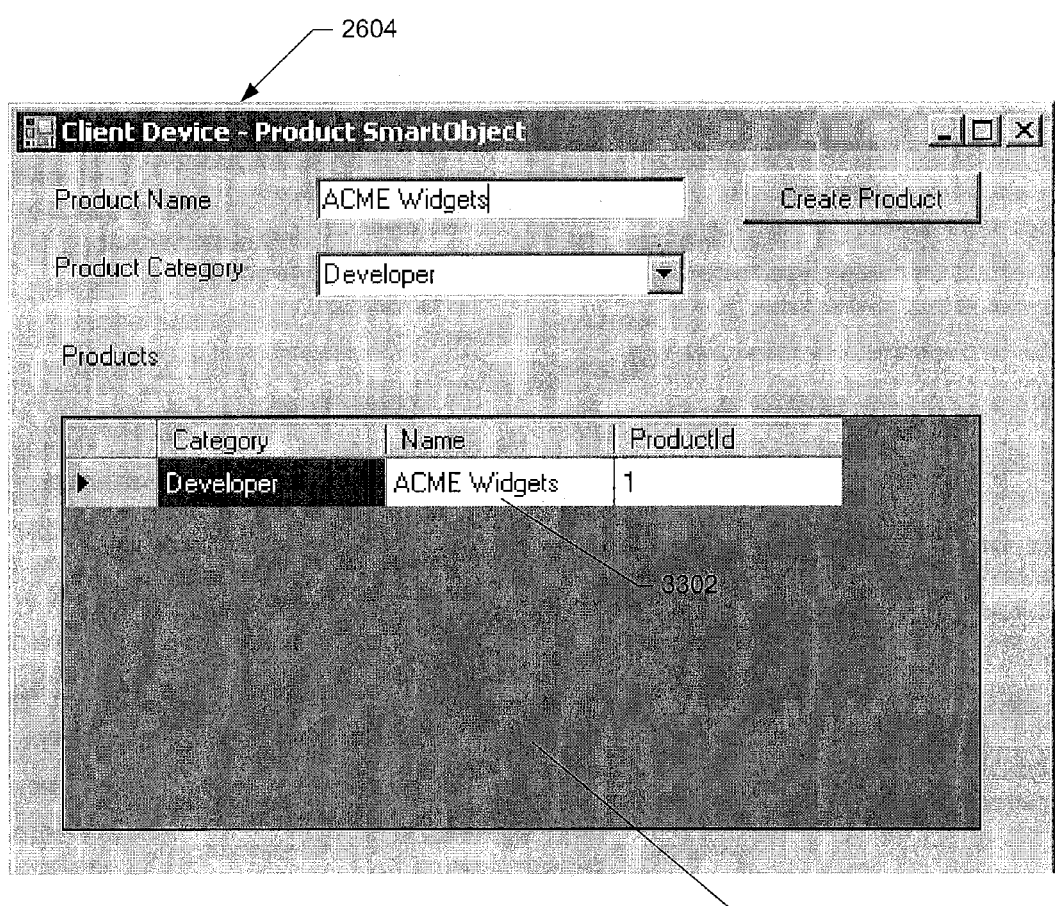
FIG. 34 is a screenshot of an example of a record of a business object created using a dynamic endpoint.
Figure 35:
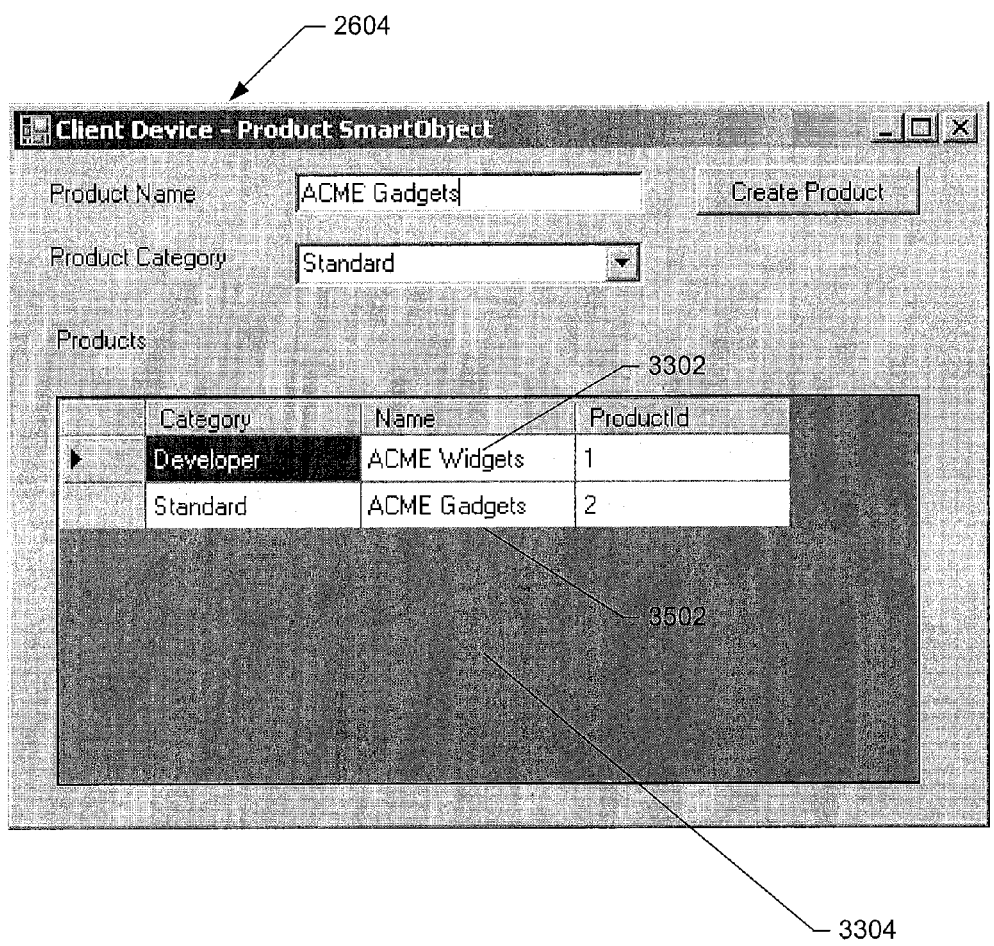
FIG. 35 is a screenshot of an example of multiple records of a business object created using a dynamic endpoint.

FIGS. 33 to 35 illustrate examples of a client device using and consuming a business object exposed in a WCF endpoint. FIG. 33 is a screenshot of an example of the client device creating a new Product record ACME Widgets 3302 using the Product business object 1810. Before the record is created, there are no Product records in record area 3304. Once the Create Product button 3306 is depressed, a new product is created as shown in FIG. 34.

FIG. 34 is a screenshot of an example of a new product called ACME Widgets 3302 with a ProductId of 1. Record area 3304 now lists ACME Widgets 3302 as a record. The Products business object 1810 can be reused to create multiple products. For example, FIG. 35 is a screenshot of an example of another new product called ACME Gadgets 3502 with a ProductId of 2. Record area 3304 shows both ACME Widgets 3302 and ACME Gadgets 3502. Both products ACME Widgets 3302 and ACME Gadgets 3502 were created using one embodiment of a dynamic endpoint.

Figure 36:
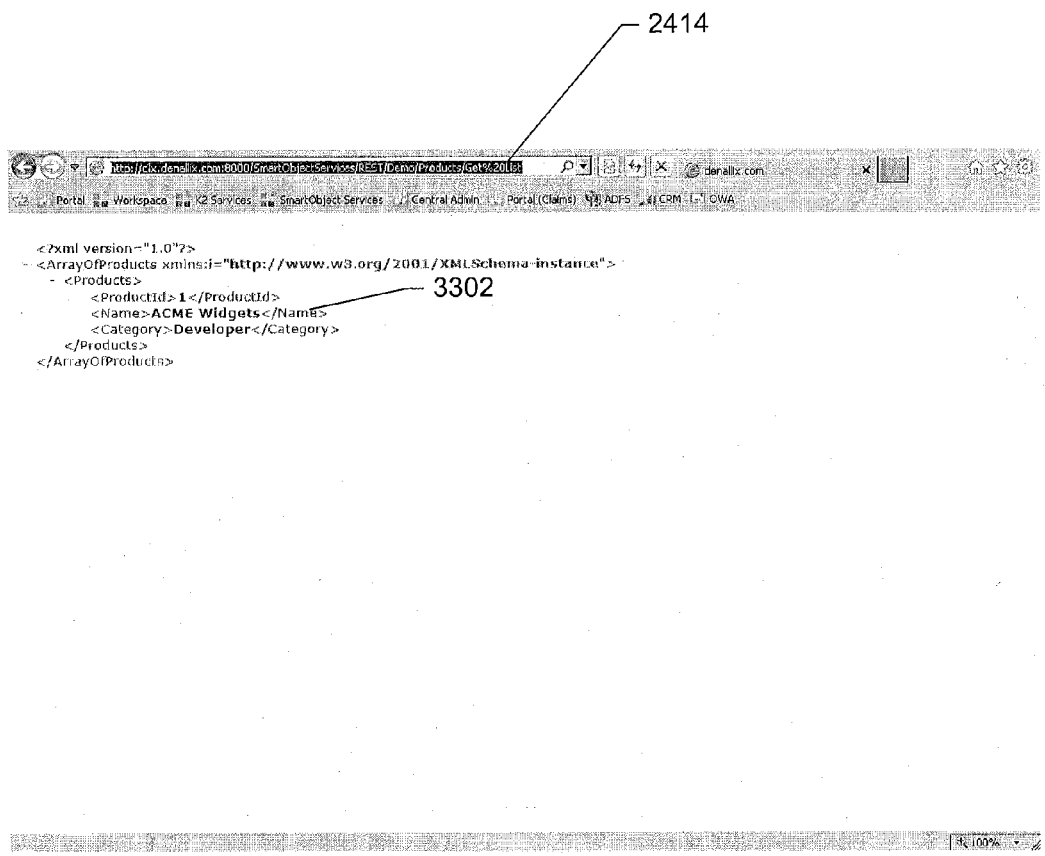
FIG. 36 is a screenshot of an example of accessing a method for an object using a REST endpoint.

FIGS. 36 to 39 illustrate examples of a client device using and consuming a business object exposed in a REST endpoint to show how ACME Gadgets could be created using a REST endpoint. FIG. 36 is a screenshot of an example of a client device using the GetList method 2414 in XML. The GetList method 2414 is a method for the Products business object 1810. Using the GetList method 2414 shows that there initially is one Product business object ACME Widgets 3302.

Figure 37:
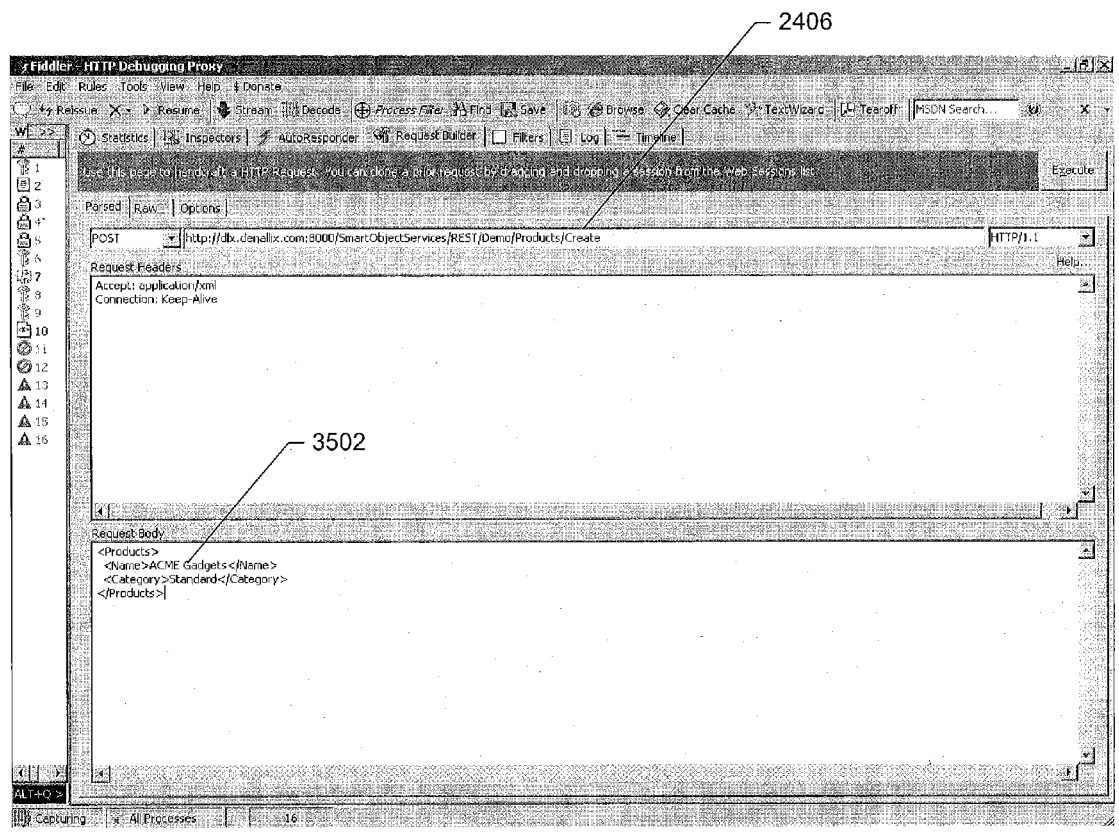
FIG. 37 is a screenshot of an example of accessing another method for an object using a REST endpoint.

FIG. 37 is a screenshot of an example of creating a Product business object 1810 using the Create method 2406. FIG. 37 shows creating a new Product business object called ACME Gadgets 3502.

Figure 38:
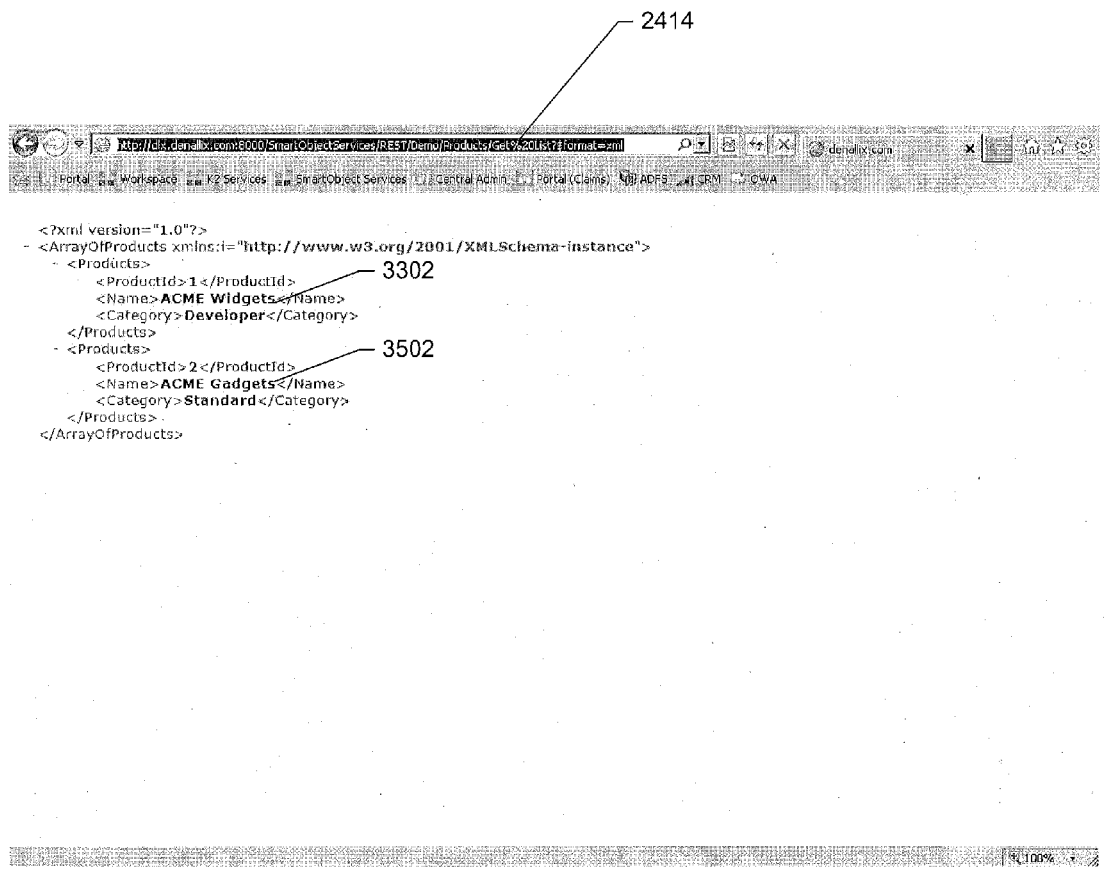
FIG. 38 is a screenshot of an example of accessing a method for an object using a REST endpoint in XML.

FIG. 38 is a screenshot of an example of using the GetList method 2414 again after ACME Gadgets 3502 has been created. FIG. 38 illustrates that the GetList method 2414 now results in two Product business objects: ACME Widgets 3302 and ACME Gadgets 3502.

Figure 39:
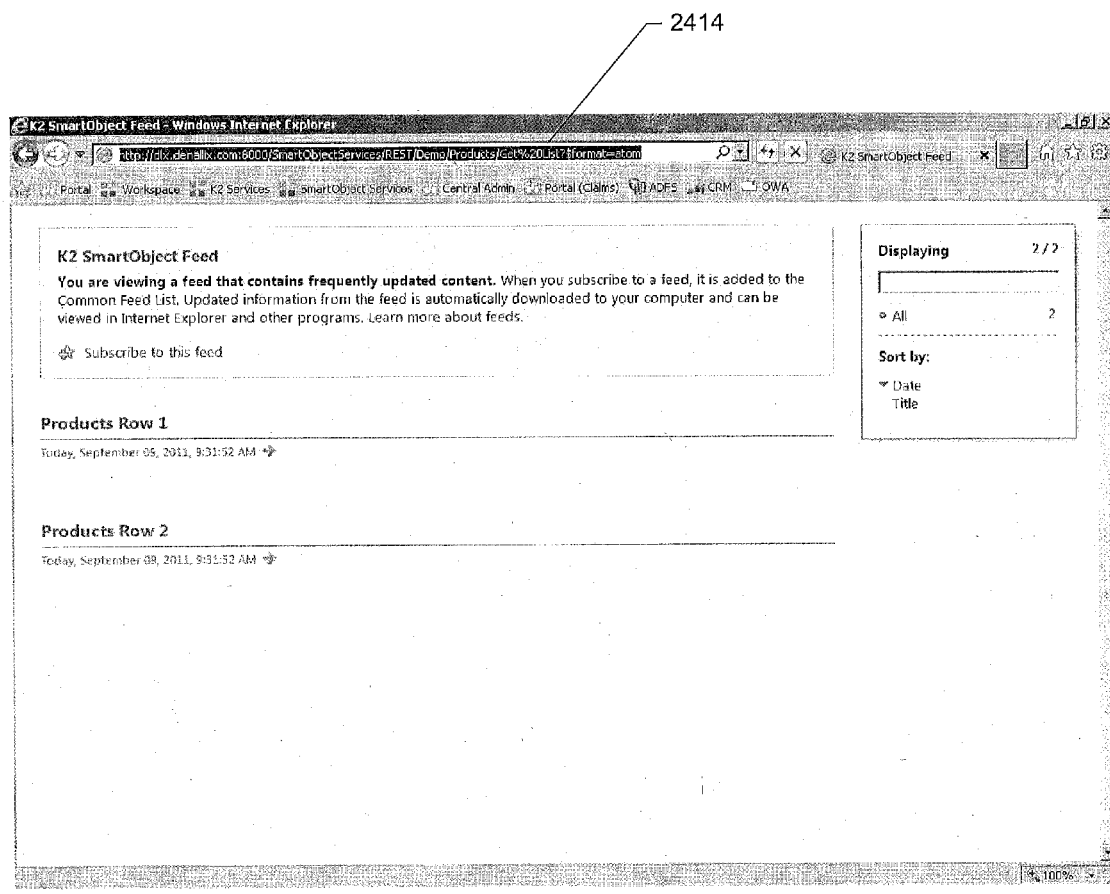
FIG. 39 is a screenshot of an example of accessing a method for an object using a REST endpoint in an Atom feed.

FIG. 39 is a screenshot of an example of using the GetList method 2414 in an Atom feed. FIG. 39 illustrates that the GetList method 2414 results in two Product business objects rows for the two objects ACME Widgets and ACME Gadgets in an Atom feed.

In an embodiment, any business resource may be made available to a client through a dynamic endpoint. For example, business objects, processes or worklists may be exposed through a dynamic endpoint.

Using the disclosed systems, developers have platform free, instant dynamic access to any business object. In one embodiment, standardized backend systems such as SAP, Siebel, Oracle DB, Oracle EBS, and SQL are exposed through the dynamic endpoint. In an embodiment, proprietary backend systems may be exposed, for example, by using adapters. Adapters make it easier to expose objects that are stored on proprietary systems.

In summary, persons of ordinary skill in the art will readily appreciate that methods and apparatus for dynamically generating, discovering, accessing and consuming business objects have been disclosed. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention is claimed as follows:

1. A method of generating a dynamic endpoint allowing a client device to consume a business object, the endpoint including an address, a binding, and a contract, the method comprising:
   loading a definition of the business object, the definition having properties and methods;
   iterating through the definition;

mapping the definition to endpoint-supported protocols, the mapping including:
  (i) mapping the business object properties to data contracts;
  (ii) mapping the business object methods to operation contracts; and
  (iii) ensuring business object method signatures have endpoint-supported inputs and outputs; and
generating the endpoint based on a configuration, the configuration including services configuration, Windows Communication Foundation ("WCF") configuration, representational state transfer ("REST") configuration, and managed configuration;
wherein the endpoint is generated in response to at least one of (a) the client device requesting the business object, (b) the business object being created and (c) the business object being updated.

2. The method of claim 1, further including generating .NET endpoints for use in a WCF framework and generating Atom, XML, and JSON endpoints for use in a REST framework.

3. The method of claim 1, wherein the business object belongs to a category, and the endpoint is generated for the category.

4. The method of claim 1, wherein the protocol configuration overrides the services configuration and the managed configuration overrides the protocol configuration.

5. The method of claim 1, wherein the endpoint is configured based upon a user selection.

6. The method of claim 1, wherein managed configuration includes configuring whether a static endpoint is generated for the business object and whether the endpoint is isolated.

7. The method of claim 6, wherein the isolation includes at least one of (i) memory isolation, (ii) address isolation and (iii) security binding isolation.

8. The method of claim 6, wherein configuring the isolation allows configuring at least one of (i) whether a server rebuilds all endpoints on the server or (ii) whether the server rebuilds less than all of the endpoints on the server.

9. A non-transitory computer readable medium storing instructions for generating a dynamic endpoint allowing a client device to consume a business object, the endpoint including an address, a binding, and a contract, the instructions causing a computing device to:
  load a definition of the business object, the definition having properties and methods;
  iterate through the definition;
  map the definition to endpoint-supported protocols, the mapping including:
    (i) mapping the business object properties to data contracts,
    (ii) mapping the business object methods to operation contracts, and
    (iii) ensuring business object method signatures have endpoint-supported inputs and outputs; and
  generate the endpoint based on a configuration, the configuration including services configuration, Windows Communication Foundation ("WCF") configuration, representational state transfer ("REST") configuration, and managed configuration;
  wherein the endpoint is generated in response to at least one of (a) the client device requesting the business object, (b) the business object being created and (c) the business object being updated.

10. The non-transitory computer readable medium of claim 9, the instructions further causing the computing device to generate .NET endpoints for use in a WCF framework and generate Atom, XML, and JSON endpoints for use in a REST framework.

11. The non-transitory computer readable medium of claim 9, wherein the business object belongs to a category, and the endpoint is generated for the category.

12. The non-transitory computer readable medium of claim 9, wherein the protocol configuration overrides the services configuration and the managed configuration overrides the protocol configuration.

13. The non-transitory computer readable medium of claim 9, wherein the endpoint is configured based upon a user selection.

14. The non-transitory computer readable medium of claim 9, wherein managed configuration includes configuring whether a static endpoint is generated for the business object and whether the endpoint is isolated.

15. The non-transitory computer readable medium of claim 14, wherein the isolation includes at least one of (i) memory isolation, (ii) address isolation and (iii) security binding isolation.

16. The non-transitory computer readable medium of claim 14, wherein configuring the isolation allows configuring at least one of (i) whether a server rebuilds all endpoints on the server or (ii) whether the server rebuilds less than all of the endpoints on the server.

17. A system for generating a dynamic endpoint allowing a client device to consume a business object, the endpoint including an address, a binding, and a contract comprising a processor structured to cause the system to:
  load a definition of the business object, the definition having properties and methods;
  iterate through the definition;
  map the definition to endpoint-supported protocols, the mapping including:
    (i) mapping the business object properties to data contracts,
    (ii) mapping the business object methods to operation contracts, and
    (iii) ensuring business object method signatures have endpoint-supported inputs and outputs; and
  generate the endpoint based on a configuration, the configuration including services configuration, Windows Communication Foundation ("WCF") configuration, representational state transfer ("REST") configuration, and managed configuration;
  wherein the endpoint is generated in response to at least one of (a) the client device requesting the business object, (b) the business object being created and (c) the business object being updated.

18. The system of claim 17, the processor structured to further cause the system to generate .NET endpoints for use in a WCF framework and generate Atom, XML, and JSON endpoints for use in a REST framework.

19. The system of claim 17, wherein the business object belongs to a category, and the endpoint is generated for the category.

20. The system of claim 17, wherein the protocol configuration overrides the services configuration and the managed configuration overrides the protocol configuration.

21. The system of claim 17, wherein the endpoint is configured based upon a user selection.

22. The system of claim 17, wherein managed configuration includes configuring whether a static endpoint is generated for the business object and whether the endpoint is isolated.

23. The system of claim 22, wherein the isolation includes at least one of (i) memory isolation, (ii) address isolation and (iii) security binding isolation.

24. The system of claim 22, wherein configuring the isolation allows configuring at least one of (i) whether a server rebuilds all endpoints on the server or (ii) whether the server rebuilds less than all of the endpoints on the server.

* * * * *